(12) United States Patent
Edamitsu et al.

(10) Patent No.: US 6,729,239 B2
(45) Date of Patent: May 4, 2004

(54) IMAGE RECORDING DEVICE FOR CORRECTING SPATIAL RECORDING ERROR

(75) Inventors: Kenji Edamitsu, Kyoto (JP); Shoji Kakimoto, Kyoto (JP); Yoshihiro Katsuma, Kyoto (JP)

(73) Assignee: Dainippon Screen MFG Co., Ltd., Kyoto (JP)

( * ) Notice: Subject to any disclaimer, the term of this patent is extended or adjusted under 35 U.S.C. 154(b) by 72 days.

(21) Appl. No.: 10/089,685

(22) PCT Filed: Aug. 6, 2001

(86) PCT No.: PCT/JP01/06762

§ 371 (c)(1),
(2), (4) Date: Apr. 3, 2002

(87) PCT Pub. No.: WO02/14070

PCT Pub. Date: Feb. 21, 2002

(65) Prior Publication Data

US 2002/0148376 A1 Oct. 17, 2002

(30) Foreign Application Priority Data

Aug. 14, 2000 (JP) ..................... P2000-245979
Aug. 24, 2000 (JP) ..................... P2000-253617

(51) Int. Cl.$^7$ .............. B41C 1/10; G06K 9/00
(52) U.S. Cl. ............. 101/485; 101/401.1; 101/463.1; 101/484; 347/262
(58) Field of Search ............... 101/401.1, 463.1, 101/465, 467, 484, 485, 486, DIG. 36; 347/232, 247, 248, 249, 250, 262; 358/1.12, 3.26, 540

(56) References Cited

U.S. PATENT DOCUMENTS 4,804,979 A * 2/1989 Kamas et al. ............... 347/116

(List continued on next page.)

FOREIGN PATENT DOCUMENTS

| JP | 61-104460 U | 7/1986 |
|----|----|----|
| JP | 61-150461 | 7/1986 |
| JP | 62-099149 | 5/1987 |
| JP | 63-5366 A | 1/1988 |
| JP | 01-181284 | 7/1989 |
| JP | 2-230268 A | 9/1990 |
| JP | 05-124294 | 5/1993 |
| JP | 11-352737 | 12/1999 |
| JP | 2000-79674 A | 3/2000 |
| JP | 2001-88267 A | 4/2001 |

Primary Examiner—Stephen R. Funk
(74) Attorney, Agent, or Firm—McDermott, Will & Emery

(57) ABSTRACT

A printing device reads an image on a printing paper with an image pickup part. It image-processes obtained image data in a control part, and operates the positions of respective register marks (R1 to R4). It operates the quantity of displacement necessary for positioning an image. It obtains an offset count number Co for deciding an image recording starting position from the obtained quantity of displacement. It stores the obtained offset count number Co while obtaining starting position data. Then, dimensional correction data for the image is calculated. The image on the printing paper is first picked up, and the necessary quantity of displacement is calculated. A speed coefficient k is calculated for changing the rotational speed of a plate cylinder. Following this, a correction quantity by a Cd default count number previously set for deciding the image recording starting position is changed. Accordingly, the offset count number Co is calculated again on the basis of the obtained speed variable k. The obtained speed coefficient k and the offset count number Co are stored, and starting position data is obtained from both data.

22 Claims, 18 Drawing Sheets

U.S. PATENT DOCUMENTS

| | | | | |
|---|---|---|---|---|
| 4,912,566 A | | 3/1990 | Tasaka | 358/451 |
| 5,115,328 A | | 5/1992 | Kadono | 358/474 |
| 5,138,667 A | * | 8/1992 | Roch et al. | 382/112 |
| 5,163,368 A | | 11/1992 | Pensavecchia et al. | 101/467 |
| 5,174,205 A | | 12/1992 | Kline et al. | 101/467 |
| 5,365,847 A | * | 11/1994 | Pers | 101/248 |
| 5,500,801 A | * | 3/1996 | Loffler | 700/122 |
| 5,576,753 A | * | 11/1996 | Kataoka et al. | 347/248 |
| 5,748,221 A | * | 5/1998 | Castelli et al. | 347/232 |
| 5,806,430 A | * | 9/1998 | Rodi | 101/484 |
| 6,253,678 B1 | * | 7/2001 | Wentworth | 101/181 |
| 6,449,385 B1 | * | 9/2002 | Huber et al. | 382/112 |

\* cited by examiner

FIG. 7
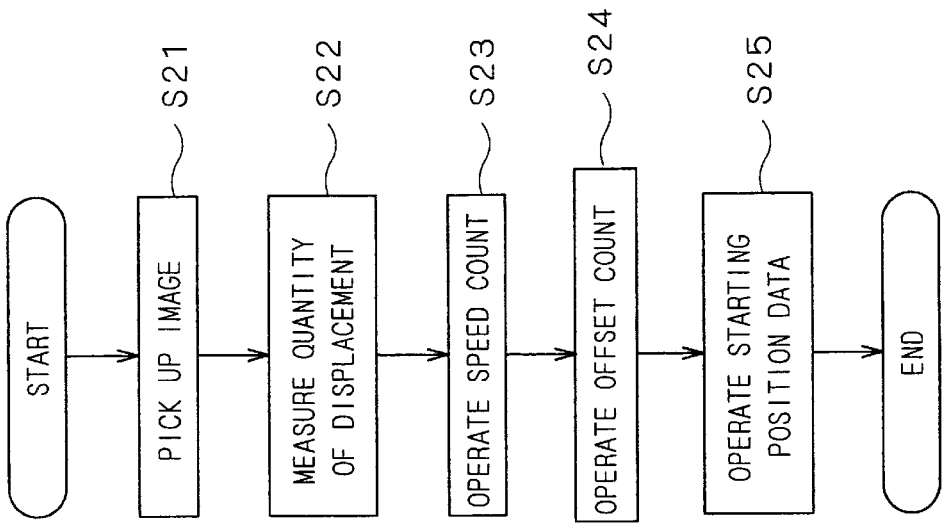
(B)
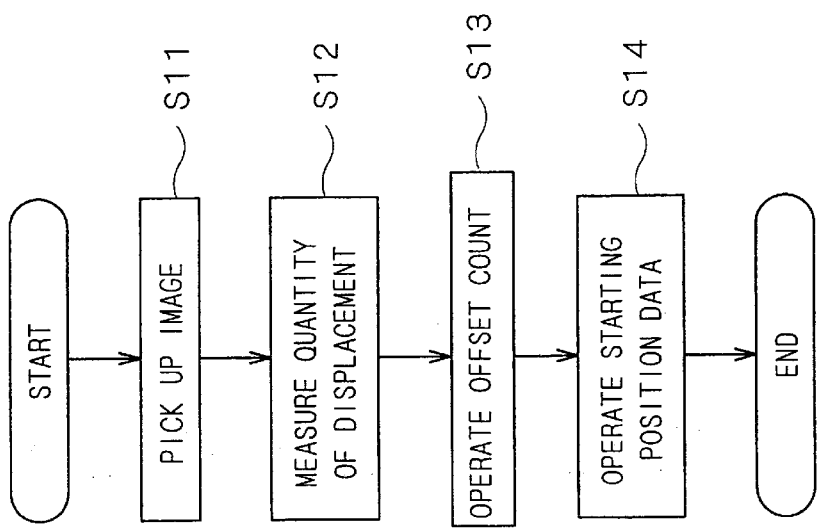
(A)

| | PRINTING CONDITION | | | | POSITION CORRECTION DATA | | |
|---|---|---|---|---|---|---|---|
| | A1 | A2 | A3 | | M PLATE n | Y PLATE k | Y PLATE n |
| DATA 1 | MAT | 180kg | WALES | | 20 | 0.9997 | 21 |
| DATA 2 | MAT | 180kg | WALES | | 22 | 0.9998 | 23 |
| DATA 3 | MAT | 180kg | LAMINATION | | 15 | 0.9999 | 16 |
| DATA 4 | COAT | 110kg | WALES | | 11 | 0.9995 | 19 |
| DATA 5 | COAT | 90kg | WALES | | 15 | 0.9999 | 20 |
| DATA 6 | COAT | 90kg | LAMINATION | | 16 | 1.0000 | 22 |
| . . | . . | | | | . . | | |

Prior Art

IMAGE RECORDING DEVICE FOR CORRECTING SPATIAL RECORDING ERROR

DESCRIPTION

1. Technical Field

The present invention relates to a printing device, and more particularly, it relates to a printing device comprising an image recording part recording an image on a printing plate on a plate cylinder on the basis of image data.

2. Background Technique

In recent years, a printing device incorporating a prepress apparatus forming an image on a printing plate on the basis of digital image data, the so-called CTP (Computer-To-Plate) apparatus, into the machine is put into practice. Such a printing device is referred to as a digital printing device, and advantageously characterized in that the same is suitable for multi-kind and small quantity printing requiring a short working time or the like since printed matter is directly obtained from image data while even an unskilled operator can readily handle the same since a prepress step or the like is automated.

Such a digital printing device, corrects a mechanical error of a plate cylinder or an encoder is corrected at the time of assembling the printing device. For example, a technique described in U.S. Pat. No. 5,163,368 is well-known as this correction method.

However, the aforementioned prior art prepares a bit memory corresponding to the positions of all dots of an image and stores the position of each dot, and hence the device structure is complicated and cannot be readily performed by an operator for the printing device. Therefore, this prior art has not been in a structure executed by an operator of each printing company every time although the same is executable as adjustment in a manufacturer/maker.

When a printing condition changes, however, when the type of a printing paper or ink, the feed rate for damping water or the like changes, for example, the quantity of displacement of printed matter changes. As a plain example, the quantity of elongation at the time when this printing paper passes through the printing device varies with the type of the printing paper, the thickness or the direction of the paper texture. That is, the printing paper elongates every time the same is brought into pressure contact with each blanket cylinder, and hence the quantity of displacement between a color printed first and a color printed last, for example, changes due to change of this elongation. It has been proven that the quantity of displacement in a plate cylinder rotational direction more remarkably influences the quality of the printed matter than that in the axial direction of the plate cylinder since elongation in the rotational direction of the plate cylinder is particularly large. It has been confirmed that such displacement remarkably changes also when exchanging a blanket of a blanket cylinder.

Registration adjustment responsive to such change of the printing condition cannot be performed by only single adjustment at the time of shipment from the factory dissimilarly to the aforementioned prior art, but adjustment must be performed every operation if necessary. Such adjustment of an image recording position is a troublesome and difficult operation for the operator, and hence an apparatus capable of registration adjustment through the simplest possible procedure has been awaited.

On the other hand, a general multicolor printing device including the aforementioned digital printing machine has such a mechanism that the printing paper is pressed by the number of colors between an impression cylinder and a blanket cylinder to be printed. In such a multicolor printing device, the printing paper tends to slightly elongate every printed color. Therefore, there is such a problem that the positions of a precedently printed image and a subsequently printed image do not match up. It follows that the printing paper is drawn between the impression cylinder and the blanket cylinder while rotating in such a state that the forward end is held in particular, and hence there is such a tendency that elongation on the rear end side of the printing paper is larger than on the forward end side of the printing paper.

In order to solve the aforementioned problem, a conventional multicolor printing device employing a printing plate prepressed through contact image transfer from an original film or the like has employed a technique of changing the position of a prepressed image on the basis of the color of the printing plate.

For example, FIG. 18 is an explanatory diagram showing an example of a case of laying out page images p1 to p8 of eight areas on a printing plate PL. While original arrangement positions of the page images p5 to p8 corresponding to the paper tail side of the printing paper are positions shown by dotted lines in FIG. 18, the same are arranged on the printing plate PL with previous displacement in the direction where the paper elongates as shown by solid lines. When arranging the images with displacement depending on the color plate, color misalignment resulting from elongation of the paper can be reduced. However, the aforementioned technique merely simulatively displaces the positions of the images, and hence correction cannot be made in accuracy as to partial elongation of the images following elongation of the paper.

Further, although it is possible to correct the position every image if it is the layout of a plurality of images such as those described above, fine position control cannot be made every part in a single image arranged substantially over the whole of the printing plate PL. In the case of such a single image, it is conceivable to position the image by changing the magnification for the dimensions of the overall image. However, the quantity of elongation of the printing paper varies with the forward end side and the rear end side, and hence it is impossible to correctly cope with this by such a technique of changing the magnification for the overall image to a constant magnification.

DISCLOSURE OF THE INVENTION

The present invention is directed to a printing device comprising an image recording part capable of recording an image on a printing plate on a plate cylinder and a printing part capable of printing the image on a printing paper with the printing plate.

According to the present invention, the printing device further comprises an input part capable of inputting an evaluation value of a spatial recording error including dimensional change of a printing range caused when printing an objective image on a printing paper in the printing part and a control part controlling the image recording part in response to the evaluation value thereby recording a corrected image subjected to correction of the spatial recording error on the printing plate.

According to the present invention, the spatial recording error including the dimensional change of the printing range resulting from printing is canceled with correction previously applied to the corrected image, so that a correct image is printed.

According to one aspect of the present invention, the evaluation value of the spatial recording error includes a first printing displacement value on an upstream part of the objective image in a rotational direction of the plate cylinder and a second printing displacement value on a downstream part of the objective image in the rotational direction, and the control part comprises a first calculation element calculating a correction value for a recording starting position of the objective image in the rotational direction on the basis of the first printing displacement value, a second calculation element calculating a correction value for an image dimension of the objective image along the rotational direction on the basis of the first and second printing displacement values and a correction value output element supplying the correction value for the recording starting position and the correction value for the image dimension to the image recording part for recording the corrected image on the printing plate.

According to the present invention, the recording position for the image can be readily corrected by inputting the evaluation value including the first and second printing displacement values.

According to another aspect of the present invention, the image recording part is capable of printing a multicolor color image on the printing paper by successively overprinting a plurality of color component images on the printing paper, and the control part controls the image recording part in response to the evaluation value for recording the objective image on said printing plate while stepwisely or continuously changing a recording magnification for the objective image in the axial direction of the plate cylinder along, the rotational direction of the plate cylinder, thereby obtaining the corrected image on the printing plate.

According to still another aspect of the present invention, the image recording part is capable of printing a multicolor color image on the printing paper by successively overlapping a plurality of color component images on the printing paper. The control part comprises a magnification control element controlling the image recording part in response to the evaluation value thereby making the recording magnification for at least one color component image among the plurality of color component images differ from the recording magnification for the remaining color component images, so that area displacement between the plurality of color component images resulting from printing is compensated for by relative difference between the recording magnifications for the plurality of color component images.

Accordingly, an object of the present invention is to provide a printing device capable of readily correcting a recording position for an image even if a dimensional error takes place in printing.

Another object of the present invention is to provide a printing device capable of readily performing registration adjustment of an image in response to change of a printing condition.

Still another object of the present invention is to correct color shift of an image resulting from elongation of a printing paper in a multicolor printing device.

BRIEF DESCRIPTION OF THE DRAWINGS

FIG. 7 shows flow charts illustrating operation procedures for starting position data and dimensional correction data for correcting the position of an image.

PREFERRED EMBODIMENTS OF THE INVENTION

First Preferred Embodiment

Figure 1:
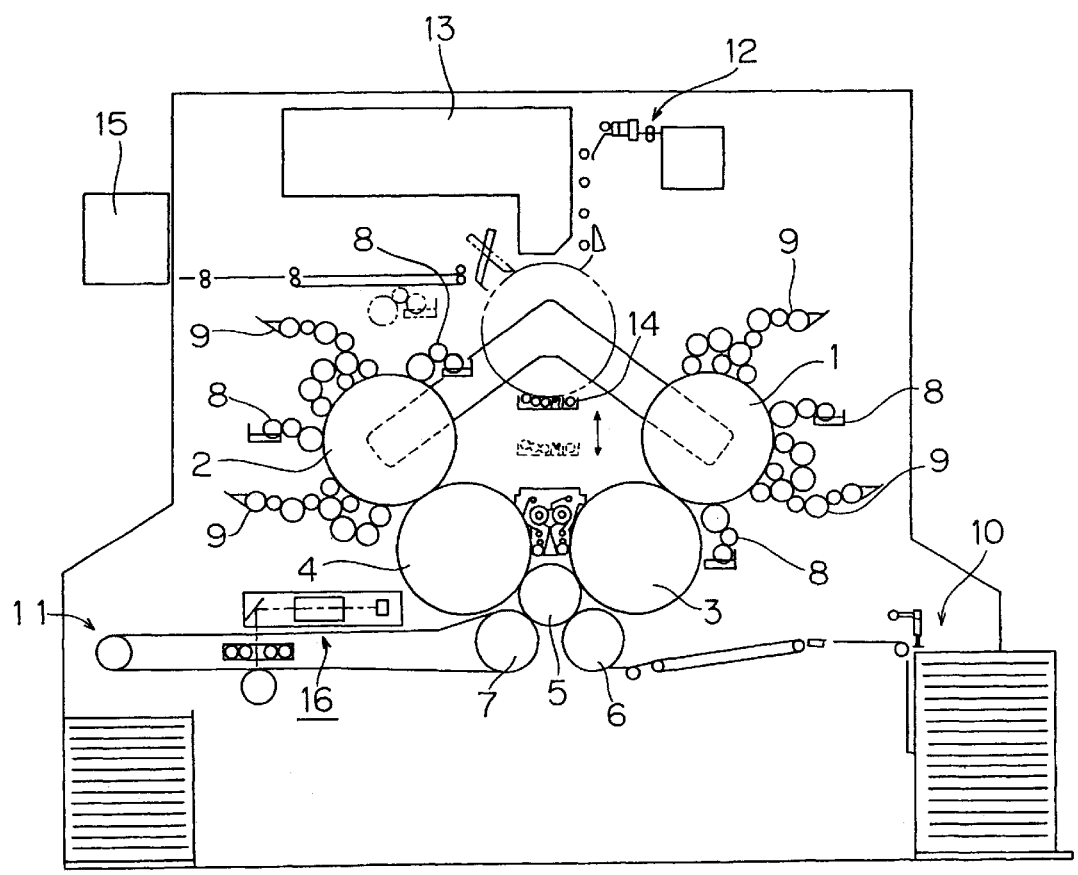
FIG. 1 is a schematic side elevational view showing an exemplary printing device according to a preferred embodiment of the present invention.
Figure 2:
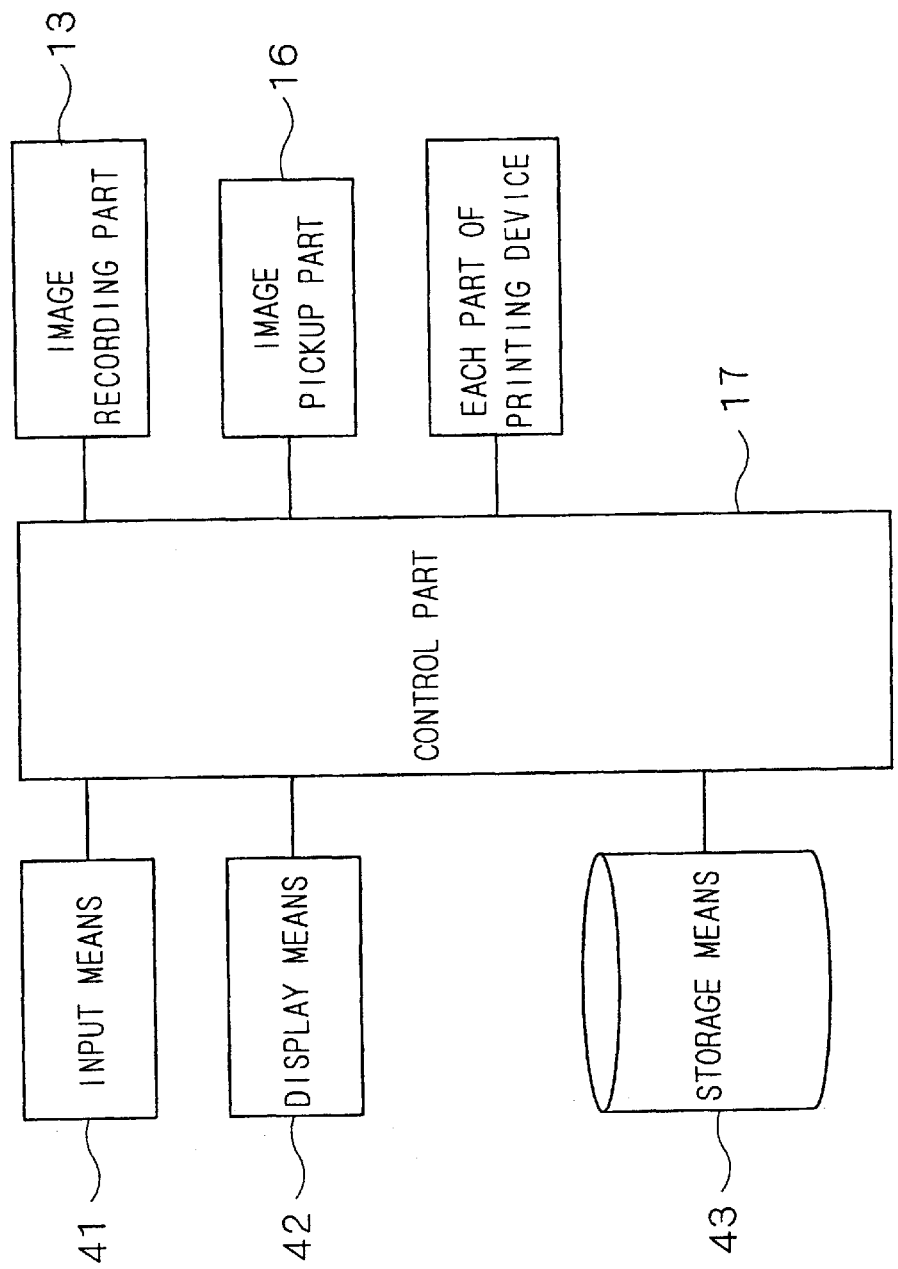
FIG. 2 is a block diagram showing the structure of a control part of the printing device.

FIG. 1 is a schematic side elevational view showing an example of a printing device according to the present invention, and FIG. 2 is a block diagram showing a control part performing control of the overall printing device.

As shown in FIG. 1, this printing device comprises first and second plate cylinders 1 and 2 holding a printing plate, first and second blanket cylinders 3 and 4 for transferring an ink image from the respective plate cylinders, an impression cylinder 5 coming into contact with both blanket cylinders 3 and 4 while holding a printing paper, a feeding cylinder 6 and a discharge cylinder 7 feeding or discharging the printing paper to or from the impression cylinder 5, water supply means 8 and ink supply means 9 supplying damping water or ink to the printing plate on the first and second plate cylinders 1 and 2, a feeding part 10 successively feeding loaded unprinted printing papers and a discharge part 11 successively loading printed printing papers, as a printing mechanism.

On the other hand, this printing device comprises a printing plate supply part 12 supplying an unexposed printing plate to the first and second plate cylinders 1 and 2, an image recording part 13 recording an image on the printing plate on the plate cylinders, a developing part 14 developing the printing plate on which the image is recorded, and a printing plate discharge part 15 discharging a used printing plate, as a prepress mechanism.

Further, this printing device comprises an image pickup part 16 for picking up an image on the printed printing paper and measuring a quantity of displacement (more generally, an evaluation value of a spatial recording error in a printing range) of the printed image and a control part 17 for controlling each part of the printing device and applying image-processing to the image obtained in the image pickup part 16, as shown in FIG. 2.

The details of the respective parts are now described.

The first plate cylinder 1 is structured to be movable between a first printing position shown by a solid line in FIG. 1 and an image recording position shown by a two-dot chain line by an unillustrated plate cylinder driving mechanism, and the second plate cylinder 2 is also structured to be movable between a second printing position shown by a solid line in FIG. 1 and the image recording position shown by the two-dot chain line by an unillustrated plate cylinder driving mechanism. That is, the first and second plate cylinders 1 and 2 are arranged on the first or second printing position respectively when executing a printing operation, and arranged on the image recording position successively in exchange so that prepress processing for the printing plate is performed on each plate cylinder when executing a prepress operation.

Figure 8:
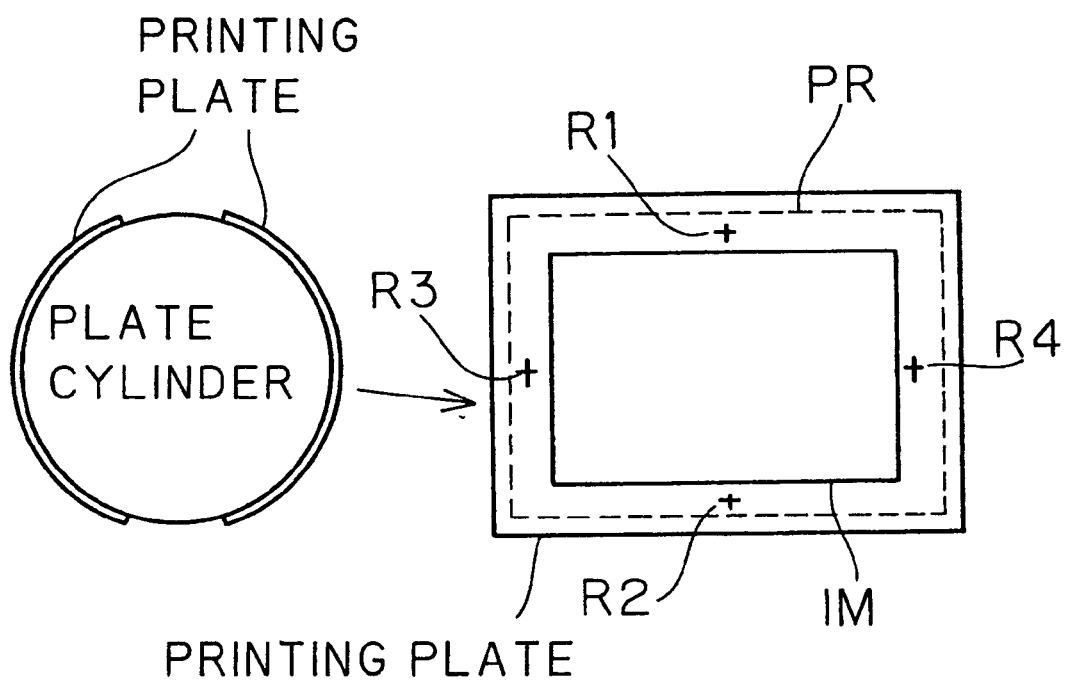
FIG. 8 is an explanatory diagram showing a printing plate.

This first plate cylinder 1 and the second plate cylinder 2 each has a peripheral surface capable of holding printing plates for two colors, and comprises two unillustrated gripping means for fixing the printing plates of the respective colors on positions opposite by 180 degrees on its peripheral surface. FIG. 8 is an explanatory diagram showing an example comprising two printing plates each having one printing region on the plate cylinders 1 and 2. A printing region PR recording an image is arranged on the printing plate as in the figure, and an image IM every color and register marks R1 to R4 for registration arranged on four sides thereof are recorded on each printing region PR.

While this preferred embodiment mounts two printing plates each having one printing region on the plate cylinder, one printing plate on which two printing regions are linearly arranged may alternatively be mounted.

Returning to FIG. 1, the first blanket cylinder 3 is structured to rotate in contact with the first plate cylinder 1 on the first printing position, and the second blanket cylinder 4 is also structured to similarly rotate in contact with the second plate cylinder 2 on the second printing position. These first and second blanket cylinders 3 and 4 have the same diameter as the first and second plate cylinders 1 and 2, and blankets capable of transferring an ink image by two colors from each plate cylinder are mounted on the peripheral surfaces thereof.

The impression cylinder 5 has a diameter half that of the first and second plate cylinders 1 and 2, and is structured to rotate in contact with both of the first and second blanket cylinders 3 and 4. This impression cylinder 5 comprises gripping means capable of holding a single printing paper having a size corresponding to the printing region on the printing plate. This gripping means can hold the printing paper by opening/closing at prescribed timing with an unillustrated opening/closing mechanism.

The feeding cylinder 6 and the discharge cylinder 7 have the same diameter as the impression cylinder 5, and comprise gripping means similar to the gripping means provided on the impression cylinder 5. The gripping means of this feeding cylinder 6 and the discharge cylinder 7 are arranged to be capable of transferring printing papers in synchronization with the gripping means of the impression cylinder 5.

In the first and second plate cylinders 1 and 2 arranged on the aforementioned first and second printing positions, the first and second blanket cylinders 3 and 4, the impression cylinder 5, the feeding cylinder 6 and the discharge cylinder 7, driving gears of the same sizes as the diameters of the respective cylinders are provided on cylinder ends with respect to the respective cylinders, and the respective gears intermesh between the cylinders coming into contact therewith respectively. Therefore, it is possible to synchronously rotate/drive the aforementioned respective cylinders by driving these gears by a printing driving motor.

In the printing device according to this preferred embodiment, the plate cylinders 1 and 2 and the blanket cylinders 3 and 4 have a double peripheral length with respect to the impression cylinder 5, whereby the impression cylinder rotates twice every time the plate cylinders 1 and 2 and the blanket cylinders 3 and 4 rotate once. When the impression cylinder 5 rotates twice while holding a printing paper, multicolor printing of four colors in total can be performed with two colors each from the first and second plate cylinders 1 and 2.

Two damping water supply means 8 are arranged for each of the plate cylinders 1 and 2 on the first and second printing positions, and can selectively supply damping water to the two printing plates on each of the plate cylinders 1 and 2. These damping water supply means 8 consist of water pans storing damping water and damping water roller groups pumping up the damping water from the water pans and transferring the same to the printing plate surfaces, and are so structured that at least rollers coming into contact with the printing plate surfaces among the damping water rollers come into contact with or separate from the plate cylinder surfaces by a cam mechanism. If the printing plates are printing plates of a type requiring no damping water, the damping water supply means 8 are unnecessary.

Two ink supply means 9 are arranged for each of the plate cylinders 1 and 2 on the first and second printing positions, and can selectively supply inks of different colors to the two printing plates on each of the plate cylinders 1 and 2. In this preferred embodiment, for example, ink supply means 8 of a color K (black) and a color M (magenta) are arranged for the first plate cylinder 1, and ink supply means 8 of a color C (cyan) and a color Y (yellow) are arranged for the second plate cylinder 2.

These ink supply means 9 consist of inkpot means storing inks and ink roller groups kneading and transferring the inks delivered from the inkpot means, and are so structured that at least rollers coming into contact with the printing plate surfaces among the ink rollers come into contact with or separate from the plate cylinder surfaces by an unillustrated cam mechanism.

Some of the damping water supply means 8 and the ink supply means 9 are structured to be capable of, in accordance with movement of the first and second plate cylinders 1 and 2, retreating from moving paths thereof.

The feeding part 10, taking out printing papers one by one from a pile loading unused printing papers and transferring the same to the feeding cylinder 6, operates to supply one printing paper every two rotations of the feeding cylinder in this preferred embodiment. The discharge part 11 receives printed printing papers from the discharge cylinder 7 and loads the same.

The prepress mechanism of this printing device is now described. This printing device alternately moves the first and second plate cylinders 1 and 2 to the image recording position when executing the prepress operation. On this image recording position, a friction roller is structured to be brought into contact with the plate cylinders to rotation-drive. This is described later with reference to FIG. 4.

The printing plate supply part 12 has a cassette roll shading and storing a roll-shaped unexposed printing plate, a transport roller and a transport guide transporting a drawn-out printing plate to the plate cylinders 1 and 2 and cutting means cutting the printing plate into a sheet. While this preferred embodiment employs a silver salt photosensitive material as a printing plate which is exposed to a laser beam to record an image, a thermal type printing plate subjected to melting or ablation with a laser, for example, may be employed.

The supply operation procedure for the printing plate is adapted to first make the gripping means of the plate cylinders 1 and 2 hold the forward end of the printing plate drawn out from the cassette roll, rotate the plate cylinders 1 and 2 in this state for winding the printing plate on the plate cylinders 1 and 2, and thereafter cut the printing plate at a prescribed length for holding the rear end of the printing plate with the other gripping means.

The image recording part 13 performs exposure on the printing plate by ON/OFF of the laser beam for recording an image. This image recording part 13 is described later with reference to FIG. 4.

The developing part 14 develops the printing plate exposed by the image recording part 13. In this preferred embodiment, the developing part 14 is in a structure of pumping up a processing solution stored in an unillustrated processing tank, applying the same to the printing plate and performing development, and provided with elevator means moving to a position retreating from the plate cylinders and a position approaching the plate cylinders. When employing an image recording method requiring no development, the development 14 may be omitted.

This printing device moves the first and second plate cylinders 1 and 2 to the image recording position, and executes the prepress operation by performing supply of the printing plate and recording and development of the image. When the prepress operation is completed, it can perform the printing operation by arranging the first and second plate cylinders 1 and 2 on the first and second printing positions respectively.

On the other hand, this printing device can automatically discharge the printing plate after termination of the printing operation. In this preferred embodiment, the printing plate discharge part 15 comprises separation means separating the printing plate from the plate cylinder present on the image recording position, transport means transporting the separated printing plate and a discharge cassette to which the transported used printing plate is discharged.

Figure 3:
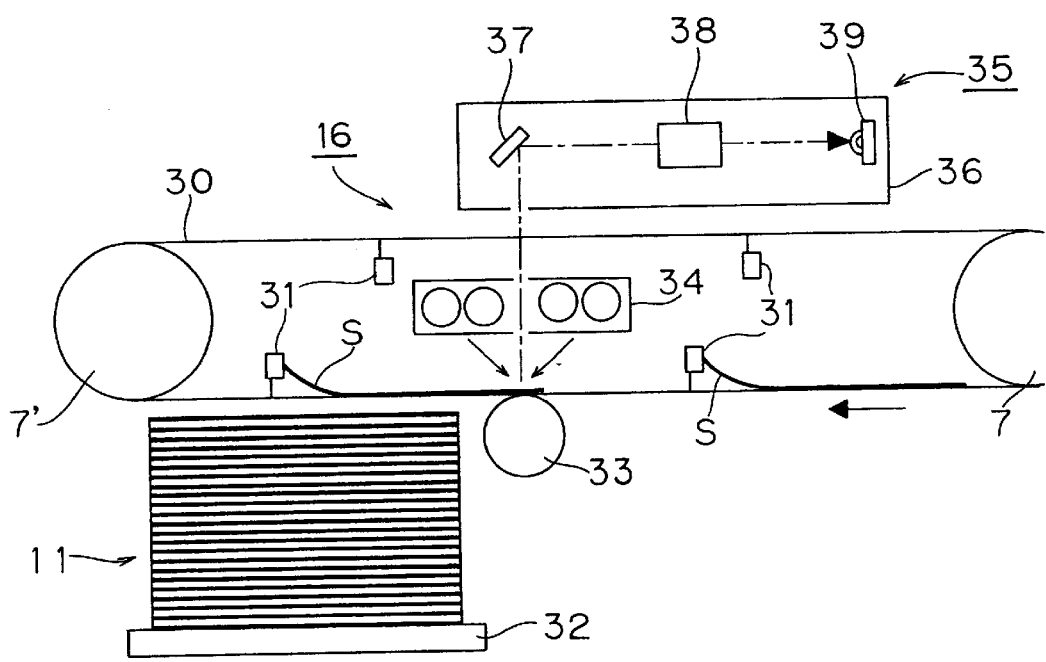
FIG. 3 is a schematic side elevational view showing the structure of an image pickup part in the printing device.

The structure of the image pickup part 16 is now described with reference to FIG. 3. FIG. 3 is a schematic side elevational view of the image pickup part 16 and the discharge part 11.

First, the discharge part 11 consists of the discharge cylinder 7, two endless chains 30 extended between this discharge cylinder 7 and two pairs of gears 7' substantially identical in diameter, a plurality of gripping means 31 transported by these two chains for transporting printing papers S and a discharge base 32 for loading the printing papers S transported by these gripping means 31.

The discharge cylinder 7 comprises gear portions for engaging with the chains respectively on both end portions, and the two gears 7' substantially identical in diameter are arranged oppositely to these gear portions. The endless chains 30 are extended over the gear portions of the discharge cylinder 7 and the gears 7'. The length of these chains 30 is set to a length of integral times the peripheral length of the discharge cylinder 7.

The gripping means 31 have pawl members capable of being opened and closed for holding the forward ends of the printing papers S, and the plurality of gripping means are fixed over the clearance between the two chains. The interval between these gripping means 31 corresponds to the peripheral length of the discharge cylinder 7. The gripping means 31 synchronously run in the form of a loop following rotation of the discharge cylinder 7. On the other hand, each gripping means 31 is structured to open/close in synchronization with unillustrated gripping means provided on the discharge cylinder 7 by an unillustrated cam mechanism, and receives the printing papers S from the discharge cylinder 7. Further, the gripping means 31 opens/closes by the unillustrated cam mechanism and discharges the printing papers S on the discharge base 32.

The discharge base 32 is a pallet-like member capable of loading a plurality of printing papers S, and performs vertical movement by unillustrated elevator means. That is, the discharge base 32 can make a discharge height for the printing papers S constant and smoothly perform the discharge operation for the printing papers S by successively lowering as the printing papers S are discharged.

The aforementioned discharge part 11 holds the forward ends of the printing papers S with the gripping means 31 and transports the same, and hence the rear ends of the printing papers S are transported in unfixed states. Therefore, flapping of the printing papers S results from the transportation. This preferred embodiment comprises a suction roller 33 stabilizing the transport state of the printing papers S on the front side of the discharge base 32 in order to suppress this flapping of the printing papers S.

This suction roller 33 comprises a large number of fine suction holes on its surface, and is connected with an unillustrated vacuum pump. Further, the suction roller is so arranged that its roller axis is parallel to the gripping means 31 and the top portion of the roller is located substantially flush with a lower passage position of said chains 30. The suction roller 33 is structured to rotate/drive in coincidence with a passage speed of the gripping means 31 or to be only rotatable. Therefore, the printing papers S are transported in a state sucked by the suction roller surface when passing through a portion on the suction roller 33, and hence the printing papers S do not flap on a portion immediately above this suction roller 33. A plate-shaped suction member planarly sucking the printing papers S may be employed in place of the suction roller 33.

The image pickup part 16 consists of illumination means 34 illuminating the transported printing papers and image pickup means 35 for picking up images on the illuminated printing papers and obtaining image data.

The illumination means 34 consists of a plurality of linear light sources arranged along the suction roller 33 for illuminating the printing papers on the suction roller 33, and is provided between the chains 30. Image pickup slits are formed on central potions of the light sources.

The image pickup means 35 comprises a housing 36 for shading and dust protection, and a mirror 37, a lens 38 and a CCD line sensor 39 arranged in this housing. This image pickup means 35 picks up images of the printing papers on the suction roller through the slits of the illumination means 34, and incident light of the images folded by the mirror 37 passes through the lens 38 and is received by the CCD line sensor 39. The CCD line sensor reads the images in correspondence to three colors of RGB. According to this preferred embodiment, it follows that the images on the printing papers are successively read line by line in response to movement of the printing papers.

The control part 17 shown in FIG. 2 is now described. As shown by a block diagram of FIG. 2, the control part 17 for controlling the respective parts of the printing device including the image recording part 13, the image pickup part 16 and the like is provided on this printing device. This control part 17 consists of a computer system comprising input means 41 such as a keyboard operable by an operator, display means 42 such as a motor and storage means 43 capable of storing image data, various types of data, programs and the like, and is connected to an unillustrated external image data creation unit by a LAN or the like, for receiving image data to be printed. This control part 17 performs processing of the image data picked up by the image pickup part 16 with control of the respective parts of the printing device.

Figure 4:
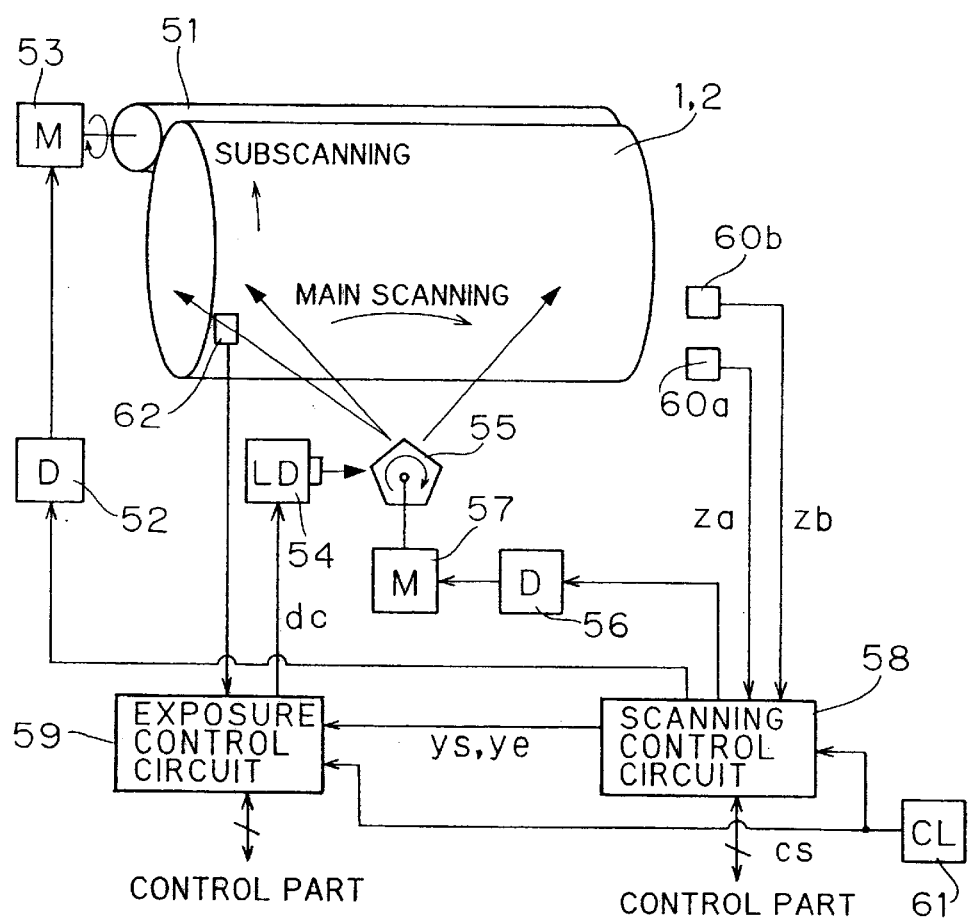
FIG. 4 is a block diagram showing the structure of an image recording part in the printing device.

The structure of the image recording part 13 is now described with reference to FIG. 4. FIG. 4 is a block diagram of the image recording part 13 and its peripheral part.

Referring to the figure, a friction roller 51 is provided to be directly or indirectly contactable with the plate cylinders 1 and 2 present on a prepress position by unillustrated driving means. The friction roller 51 is rotated/driven by a driving motor through a motor driver 52. According to this preferred embodiment, therefore, it is possible to rotate the friction roller 51 by the driving motor 53 for rotating/driving the plate cylinders 1 and 2 following this. For the contact between the friction roller 51 and the plate cylinders 1 and 2, the roller material, the contact pressure and the like are so set that no sliding takes place.

On the other hand, the image recording part 13 comprises a laser light source emitting a laser beam for recording and a polygon mirror 55 deflecting the laser beam emitted from the laser light source 54 to the printing plate, as means for recording images on the printing plate on the plate cylinders 1 and 2. The laser light source 54 comprises a semiconductor laser and its peripheral optical system, and ON/OFF-drives the semiconductor laser for enabling spot exposure with the laser beam. The polygon mirror 55 comprises five mirror surfaces deflecting the laser beam, and is rotatably supported to scan the laser beam along the axial direction of the plate cylinders 1 and 2. The polygon mirror 55 is rotated/driven by a driving motor 57 through a motor driver 56.

The image recording part 13 further comprises a scanning control circuit 58 for driving/controlling the driving motors 53 and 57 and an exposure control circuit 59 controlling the laser light source 54 on the basis of the image data.

Figure 10:
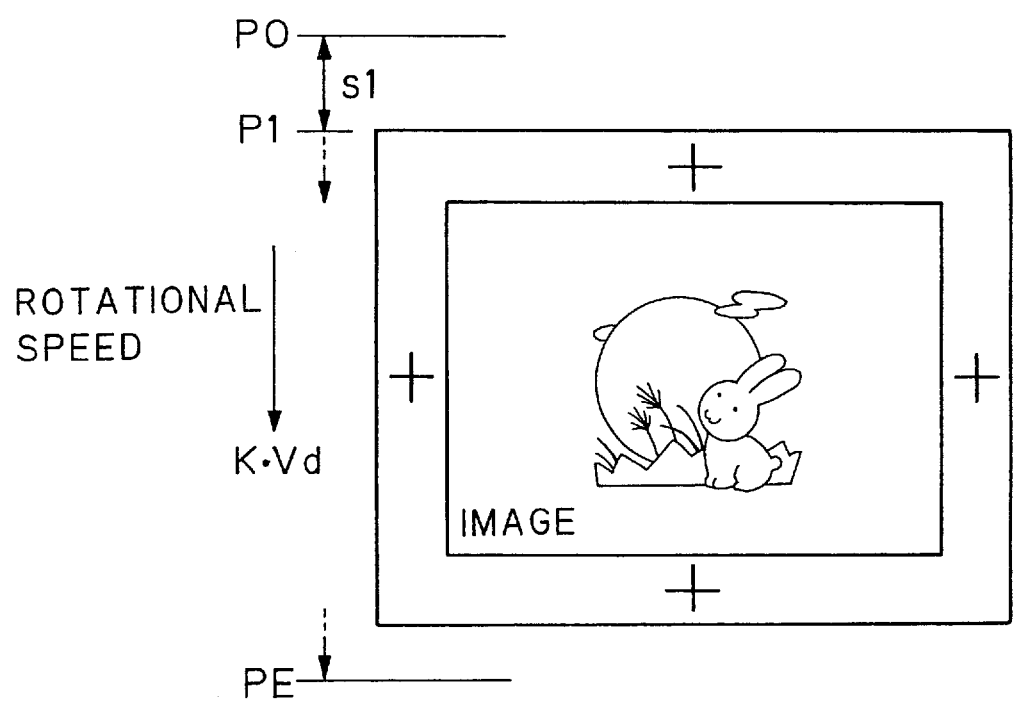
FIG. 10 is an explanatory diagram for illustrating an image recording starting position in the main scanning direction.

The scanning control circuit 58 is connected to two sensors 60a and 60b detecting origin positions in rotation of the plate cylinders 1 and 2 and an oscillator 61, so that origin position detection signals za and zb and a reference clock signal cs are input from the respective ones. The sensors 60a and 60b are optical sensors optically detecting unillustrated detection members set on the plate cylinders 1 and 2, and two such sensors are provided for detecting origin positions (P0 in FIG. 10) for two printing regions on the plate cylinders. The following description is made also with reference to FIG. 10 for an image recording starting position. FIG. 10 is an explanatory diagram for illustrating the positional relation of the image recording starting position on the printing plate.

Returning to FIG. 4, the scanning control circuit 58 controls the driving motor through the motor driver 52 to rotate at a prescribed speed on the basis of the input respective signals. That is, it is possible to control the rotational speed of the plate cylinders 1 and 2 by counting the interval between the input timings of the respective ones of the origin point detection signals za and zb with the reference clock signal cs and feedback-controlling the driving motor 53 so that this count value reaches a prescribed value. The scanning control circuit 58 controls the driving motor 57 through the motor driver 56 to rotate the polygon mirror 55 at a prescribed speed.

On the other hand, the image recording part 13 sets a position advancing from the origin position P0 in a subscanning direction by a prescribed offset quantity s1 in the subscanning direction as an image recording starting position P1 in the subscanning direction as shown in FIG. 10, for correcting displacement of the image in the subscanning direction by changing the offset quantity s1. Therefore, the scanning control circuit 58 generates an image recording starting signal ys for setting the image recording starting position P1 in correspondence to the offset quantity s1, and supplies this image recording starting signal ys to the exposure control circuit 59.

That is, the scanning control circuit 58 starts to count the reference clock signal cs in response to input of the origin position detection signals za and zb and outputs the image recording starting signal ys to the exposure control circuit 59 in response to counting of the reference clock signal cs by a number corresponding to the previously set offset quantity s1. Similarly, the image recording part 13 outputs a plate cylinder rotation end signal ye defining a rotation end position PE in response to ending of the counting of the prescribed reference clock signal number from the origin position P0.

The exposure control circuit 59 internally generates a dot clock signal dc deciding the timing for recording the image on the basis of the reference clock signal cs. It drives the laser light source 54 on the basis of the image data according to the timing of the dot clock signal dc starting from input of the image recording starting signal ys, for generating the laser beam for image recording. This laser beam is periodically deflected by the polygon mirror 55, and scans the printing plate in the axial direction (main scanning direction) of the plate cylinders. A start sensor 62 is provided to detect the head position of the laser beam in main scanning of each laser beam.

Figure 5:
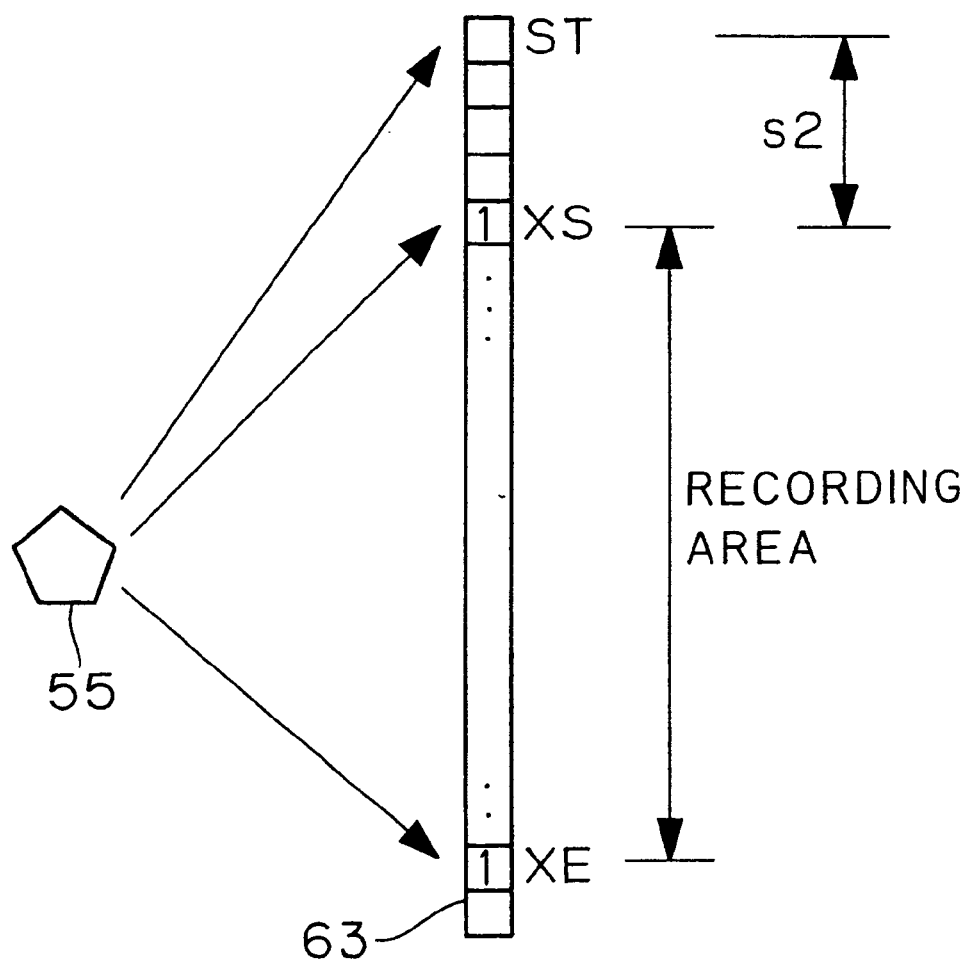
FIG. 5 is an explanatory diagram for illustrating positioning of an image in a main scanning direction.

In this exposure control circuit 59, it is possible to correct the image recording position in the main scanning direction, similarly to correction in the subscanning direction. FIG. 5 is a diagram for illustrating the image recording position of the main scanning direction in the exposure control circuit 59. A timing memory 63 is prepared in the exposure control circuit 59, in correspondence to the position (address) in the main scanning direction scanned by the polygon mirror 55. Each address position of this timing memory 63 corresponds to the position of a dot recorded in the main scanning direction.

In this mechanism, the exposure control circuit 59 first starts reading from the timing memory 63 at the timing of the dot clock signal dc from a point of time detecting the laser beam with the start sensor 62 (address ST in FIG. 5).

When the read contents from the timing memory 63 are data expressing recording starting, the exposure control circuit 59 successively delivers image data to be recorded to the laser light source 54, and starts recording (address XS in FIG. 5). When the read contents from the timing memory 63 become data expressing recording termination, the exposure control circuit 59 ends recording (address XE in FIG. 5).

In this structure, a displacement quantity s2 of the recording position reaching the address XS from the address ST corresponds to the offset quantity s1 in the subscanning direction, and an area corresponding to the addresses XS to XE defines a recording area of the image in the main scanning direction. Therefore, positioning of the image in the main scanning direction is performed by properly setting or changing the addresses XS and XE for writing recording starting and end data in the timing memory 63.

While, in this preferred embodiment, data are written in the timing memory 63 only in the recording starting position and the end position for the image, it may be necessary to set a burning out area in the peripheral part of the printing plate depending on the type of the printing plate. In a case of a positive silver salt photosensitive material, for example, the so-called "burning out" processing exposing the peripheral part of the printing plate so that no ink sticks is necessary. When performing such burning out processing, burning out starting and burning out end data are written in the timing memory 63. In a burning area set in this manner, the exposure control circuit 59 may perform recording with previously prepared burning out image data.

In place of the burning out image data, various management data or marks, e.g., image data such as a color management chart, for example, may be prepared to be recorded on an end of the printing plate.

A positioning principle for the recording position for the image in the printing device according to this preferred embodiment is now described.

In this preferred embodiment, the offset quantity s1 (m) from the origin position P0 to the image recording starting position P1 is set by:

$$S1 = y \cdot n \qquad \text{expression 1}$$

where
- "y" represents the length on the plate cylinders corresponding to each pulse cs of the reference clock signal, and
- "n" represents the count number for the reference clock signal cs. That is, change of the offset quantity s1 is performed by increase/decrease of the count number n for the reference clock signal cs.

According to this preferred embodiment, the count number n is set according to a conditional expression:

$$N = (Cd/k + Co) \qquad \text{expression 2}$$

where
- "Cd" represents a default count number set in shipment,
- "Co" represents an offset count number arbitrarily settable by the operator, and
- "k" represents a speed coefficient in a case of varying the rotational speed of the plate cylinders. Therefore, this preferred embodiment substantially corrects the recording starting position in the subscanning direction by changing the offset count number Co. From the above expression 1 and the expression 2, $$Co = s1/y - Cd/k \qquad \text{expression 3}$$

is obtained, and this expression 3 is used for control.

The length y for one pulse is obtained as follows: First, the default rotational speed of the plate cylinders is assumed to be Vd (rps), and this is multiplied by the speed coefficient k as k·Vd (rps) when varying the speed of the plate cylinders. Assuming that L (m) represents the peripheral length of the plate cylinders and t (sec) represents a time interval of the reference clock signal cs for one pulse, the peripheral speed on the plate cylinders reaches L·k·Vd (m/sec), and hence the length y (m) for one pulse of the reference clock signal on the plate cylinders is obtained as:

$$Y = t \cdot L \cdot k \cdot Vd \qquad \text{expression 4}$$

A correction procedure according to an actually measured displacement quantity is now described with reference to flow charts of FIG. 6 and FIG. 7.

Figure 6:
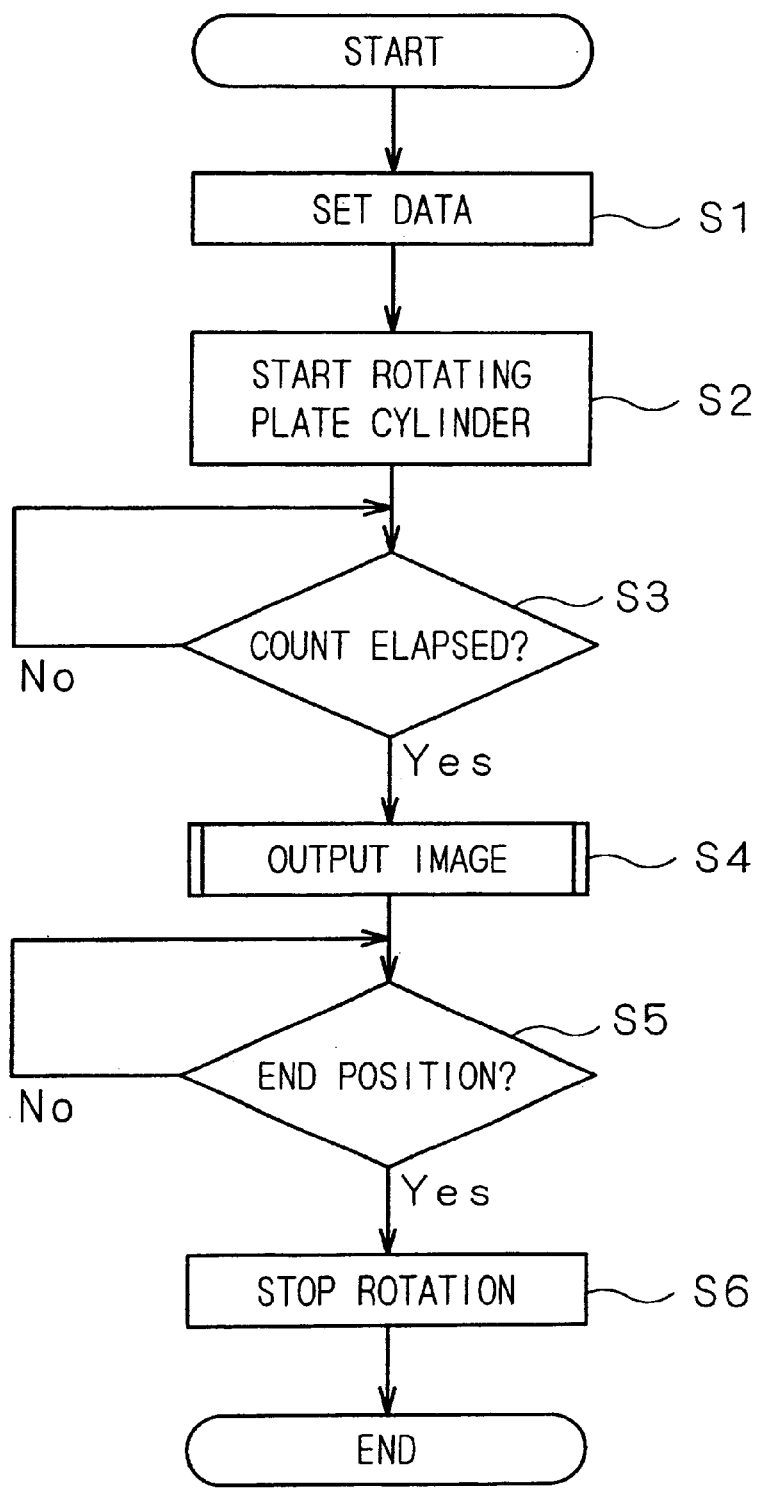
FIG. 6 is a flow chart showing an image recording procedure in the printing device.

First, the flow chart of FIG. 6 shows a procedure for recording an image on the printing plate. Referring to the figure, various types of data are set by the control part with respect to the scanning control circuit 58 and the exposure control circuit 59 at a step S1. At a step S2, the plate cylinders 1 and 2 move to the prepress position and start rotating. At this point, the speed of the plate cylinders is adjusted to reach the value k·Vd, and it advances to a step S3 when the rotational speed of the plate cylinders is stabilized.

At a step S3, the scanning control circuit 58 counts the reference clock signal cs from the point of time detecting the origin signal za or zb, and determines that it has reached the recording starting position P1 when this count value reaches the count number n corresponding to the offset quantity s1. Thus, the recording starting signal ys is output from the scanning control circuit 58 to the exposure control circuit 59.

When determining that it has reached the recording starting position P1 at the step S3, it advances to a step S4. At this step S4, the exposure control circuit 59 controls the laser light source 54 on the basis of the image data, so that recording of the image is started.

At a step S5, the control part 17 determines whether or not the scanning control circuit 58 has output the image recording end signal ye. When the control part 17 determines that it has reached the image recording end position at the step S5, rotation of the plate cylinders 12 is stopped at a subsequent step S6.

While the above flow makes description only as to recording of the image on the single printing plate on the plate cylinders, it repeats the aforementioned procedure and makes recording for two plates every plate cylinder in practice.

Flow charts of FIG. 7 show operation procedures for data related to positioning of the image, while FIG. 7(A) is to obtain starting position data for correcting the image recording starting position and FIG. 7(B) is to obtain dimensional correction data for correcting the dimensions of the image respectively. Each procedure is individually performed by the number of printing colors, and if it is a double cylinder comprising two printing regions, it operates the starting position data and dimensional correction data every printing region.

Referring to FIG. 7(A), it first reads the image on the printing paper with the image pickup part 16 at a step S11. At a step S12, the obtained image data is subjected to image processing in the control part 17, and the positions of the respective register marks R1 to R4 are calculated. Then, a displacement quantity necessary for positioning the image is calculated.

At this point, FIG. 9(A) is a diagram showing color shift on the printed printing paper, and FIG. 9(B) and FIG. 9(C) are diagrams showing displacement of the respective register marks R1 and R2. FIG. 9(B) and FIG. 9(C) are directed to only two colors of black (Bk) and magenta (M), while omitting two colors of cyan and yellow. Further, this example is directed to only positioning of the image in the subscanning direction.

In this case, a value "at" indicates a displacement quantity of the color M in the subscanning direction with respect to the color BK on the position of the register mark RI, and a value "b" indicates a displacement quantity of the color M in the subscanning direction with respect to the color Bk on the position of the register mark R2. The dimension Y0 in the subscanning direction forming a reference between the register marks RI and R2 may be previously calculated based on the image data from the image data, or the operator inputs the same on the basis of the final finished dimension.

In the aforementioned example, it follows that the image recording starting position for the image of the color M is displaced by the displacement quantity (+a) in the subscanning direction with respect to the image of the color Bk. It also follows that a dimensional error is caused in the image of the color M by a quantity (−a+b) with respect to the image of the color Bk.

At a step S13, it obtains the offset count number Co from the obtained displacement quantity. This is calculated by substituting the value of the measured displacement quantity a in the variable s1 included in the set of the operational expressions: Co=s1/y−Cd/k and y=t·L·k·Vd.

At a step S14, it stores the obtained offset count number Co while setting n=Cd/k+Co as starting position data.

Referring to FIG. 7(B), the dimensional correction data for the image is calculated. At a step S21 and a step S22, the image on the printing paper is picked up similarly to the precedent steps S11 and S12, and a displacement quantity serving as information necessary for later correction is calculated.

At a subsequent step S23, the speed coefficient k is calculated. In the aforementioned example, the actual dimension Y is in the following relation with respect to the reference dimension Y0:

$$Y=Y0+(b-a) \quad \text{expression 5}$$

and hence it changes the dimension (recording magnification) for the recorded image in the subscanning direction by correcting the rotational speed of the plate cylinders in response to the ratio of k=Y/Y0. That is, the speed coefficient k corresponds to the dimensional correction data for correcting the dimension of the image in this preferred embodiment.

At a subsequent step S24, it re-operates the offset count number Co. That is, the speed coefficient k has been changed at the precedent step S23, and hence it follows that the speed k·Vd of the plate cylinders has also been changed. Therefore, the correction quantity by the default count number Cd previously set for deciding the image recording starting position is changed. At this step S24, therefore, the offset count number Co is calculated again on the basis of the obtained speed variable k. At a step S25, the obtained speed coefficient k is stored and the offset count number Co. The speed coefficient k and the offset count number obtained through the procedures of the FIG. 7(A) and FIG. (B) are stored in storage means as the dimensional correction data and the starting position data, and can be used at the time of subsequent printing and prepress operations.

Second Preferred Embodiment

Figure 11:
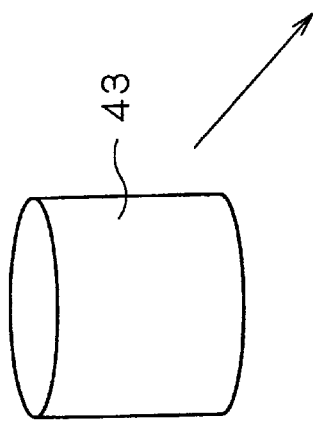
FIG. 11 is an explanatory diagram for illustrating storage of position correction data in correspondence to printing conditions.

In this second preferred embodiment, a mode of storing the starting position data, the dimensional correction data and the like (hereinafter generically referred to as positional correction data) in correspondence to printing conditions is described. In this preferred embodiment, there is a correction database area storing the starting position data and the dimensional correction data in storage means 43. FIG. 11 is an explanatory diagram showing an exemplary structure of this correction database area.

As in FIG. 11, recording areas such as a printing paper name A1, the thickness A2 of a printing paper, the direction A3 of the paper texture of the printing paper and the like, for example, are set in the correction database area as printing conditions. It may select the respective ones of such printing conditions from a previously input plurality of condition data for use, or an operator may input concrete condition data. It stores starting position data and dimensional correction data previously obtained in the apparatus of the first preferred embodiment, for example, in this correction database area in relation to the respective ones of the printing condition data every printing color.

When newly performing prepress in a printing operation, on the other hand, displacement of an image following change of printing conditions can be properly corrected when making such setting that corresponding positional correction data are automatically selected from the aforementioned correction database with keys of printing conditions.

When no correction data corresponding to the same printing conditions are present in the correction database at this time, printing conditions most approximate to the printing conditions in a printing process to be executed may be approximately selected from the correction database, or approximate correction data as to the printing process may be inferred on the basis of printing conditions present in the correction database.

Most simply, priorities may be assigned to the respective ones of a plurality of printing condition categories for preferentially selecting the same printing conditions as the printing process as to a printing condition category having a high priority. For example, the type and the printing order of the printing paper remarkably act in relation to elongation of printed matter, and hence these printing condition categories are set to higher priorities than the remaining printing condition categories. Then, correction data matching with the printing conditions of the printing process may be successively selected in the order from the printing condition categories having high priorities.

The printing device may not automatically decide correction data but the operator may select the same from past correction data. At this time, the correction database are preferably such that the correction data are sorted with printing conditions or in a time-series manner for rendering the same displayable on display means 42. The sorting in a time-series manner makes it possible to express change of a displacement quantity resulting from aged deterioration or the like.

On the other hand, it may be necessary to adjust positioning correction of an image with such positional correction data again when exchanging blankets of blanket cylinders 3 and 4. Therefore, it is preferable to also add an exchange period for the blankets to the correction database as a printing condition category. As to such correction data that a blanket exchange period differs from blankets used in the printing process among printing conditions registered in the correction database, for example, it may render the correction data not preferentially selected even if the remaining printing conditions of the correction data are identical to the printing process.

Modifications of First and Second Preferred Embodiments (1) While positioning of the image in the subscanning direction (plate cylinder rotational direction) has been mainly described in the aforementioned first preferred embodiment, this is because displacement of the image in the rotational direction of the plate cylinders is larger than displacement in the axial direction of the plate cylinders. Positioning of the image in the main scanning direction (the axial direction of the plate cylinders) can be performed similarly to the aforementioned positioning in the subscanning direction. That is, displacement quantities in the main scanning direction on the left and right register marks R3 and R4 of the image may be read to and perform an image recording starting position in the main scanning direction and dimensional correction in the main scanning direction with respect to these values.

The former is achieved by changing a set range for a recording area by the timing memory 63 on the basis of the displacement quantity. The dimensional correction in the main scanning direction can be readily performed when changing the rotational speed of the polygon mirror 55.

(2) While the dimension of the overall subscanning direction is corrected in the aforementioned first preferred embodiment, dimensional correction may be performed every partial area by changing the rotational speed of the plate cylinders every plurality of divided areas in the subscanning direction. For example, a displacement quantity in the subscanning direction in the register mark R3 or R4 corresponding to an intermediate point between an upstream part and the downstream part in the rotational direction of the printing plate is also measured in FIG. 8, to calculate a displacement quantity of the image in the subscanning direction between the register marks R1 and R3 (R4) and a displacement quantity of the image in the subscanning direction between the register marks R3 (R4) and R2. The speed coefficient k is calculated with respect to each displacement quantity to change the rotational speed of the plate cylinders about the subscanning position of the register mark R3 (R4). Thus, it is possible to correct distortion of the image in the subscanning direction. Further, relative positions of a plurality of intermediate points having different positions in the subscanning direction may be measured to individually change the rotational speed of the plate cylinders 1 and in areas between the plurality of intermediate points on the basis of the plurality of printing displacement values.

(3) The aforementioned first preferred embodiment has such an advantage that the operation is simple since the image pickup part 16 picks up the image of the printing paper for obtaining the displacement quantity by image processing. However, a value manually measured by the operator may be input from the input means 41 such as a keyboard in order to simplify the device structure.

(4) As to measurement of the displacement quantity, displacement of the image itself may be measured in place of detecting the same from the positions of the register marks provided on the four sides of the outer periphery of the image. However, measurement is easier and the measurement result is more stably obtained when measuring the displacement quantity from the register marks. The respective register marks may be present on ends (four corners) of the image.

(5) In the preferred embodiments, the dimensional correction of the images may be achieved by changing the cycle of the clock signal in place of performing the same by change of the rotational speed of the plate cylinders. Also in this case, the calculation of the offset count number Co deciding the image recording starting position is conducted again in accordance with cycle change of the clock signal.

Third Preferred Embodiment

Multicolor printing devices according to third to seventh preferred embodiments of the present invention have mechanisms similar to the printing devices according to the first and second preferred embodiments. Therefore, the description already made with reference to FIG. 1 to FIG. 5 and FIG. 9 is also applied to the following preferred embodiments. Therefore, description is made about items specific to the following preferred embodiments.

Figure 9:
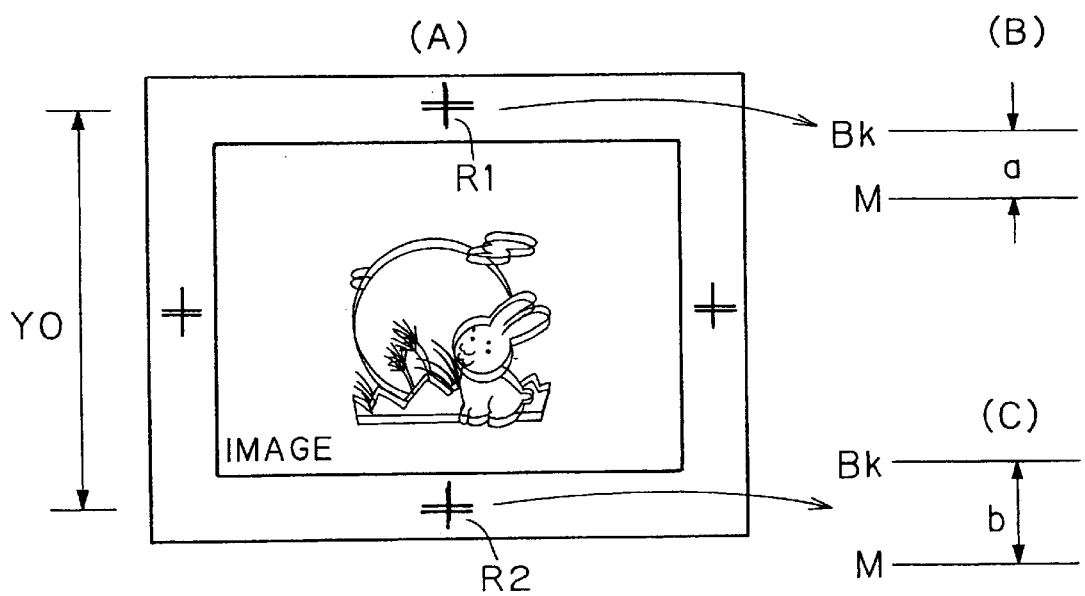
FIG. 9 is an explanatory diagram for illustrating displacement of an image on a printing paper.

In the multicolor printing devices of the third to seventh preferred embodiments, a printing region PR recording an image is arranged on a printing plate as shown in FIG. 9 in two printing plates wound on plate cylinders 1 and 2 respectively. Not only an image IM every color but upper, lower, left and right positioning marks (register marks) R1 to R4 of the image IM and positioning marks R11 to R14 for cutting, for example, arranged on four corners of the image IM are recorded on each printing region PR.

In the multicolor printing device according to the third preferred embodiment, a correction procedure according to a measured displacement quantity is described with reference to flow charts of FIG. 12 to FIG. 14.

Figure 12:
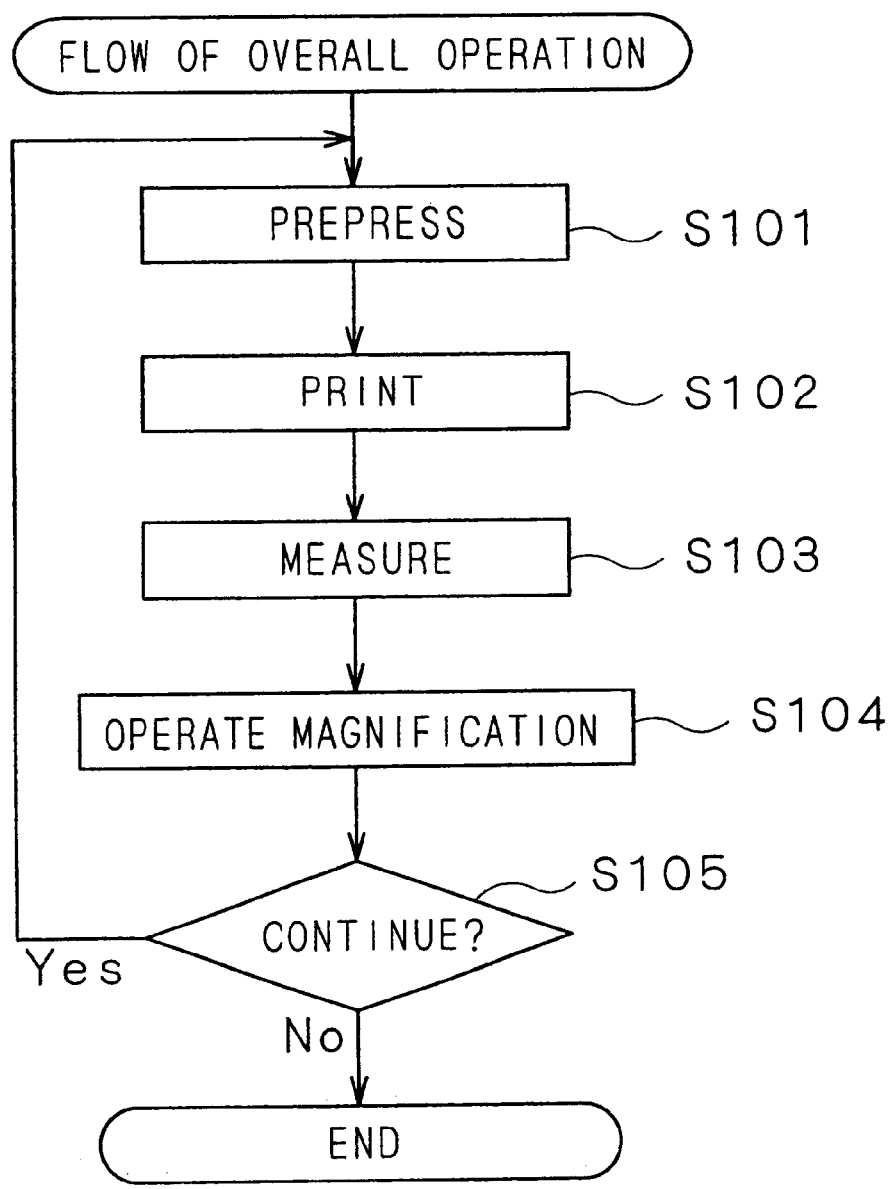
FIG. 12 is a flow chart showing a procedure of an overall operation in a multicolor printing device.

First, the flow chart of FIG. 12 indicates a main flow of a printing operation by the multicolor printing device in the third preferred embodiment. At a step S101 in FIG. 12 a prepress operation is first performed, and a printing plate is created. At a subsequent step S102, printing is performed with the prepressed printing plate. At a subsequent step S103, a control part 17 calculates the displacement quantity by reading the positioning marks R1 to R4 on a printed printing paper with an image pickup part 16. At a step S104, a magnification at the time of recording an image is calculated from the obtained displacement quantity, and is stored in storage means 43. At a step S105, it determines whether or not there is a subsequent printing operation, to return to the step S101 if there is the subsequent operation while performing various types of end processing and ending this flow when there is none.

Figure 13:
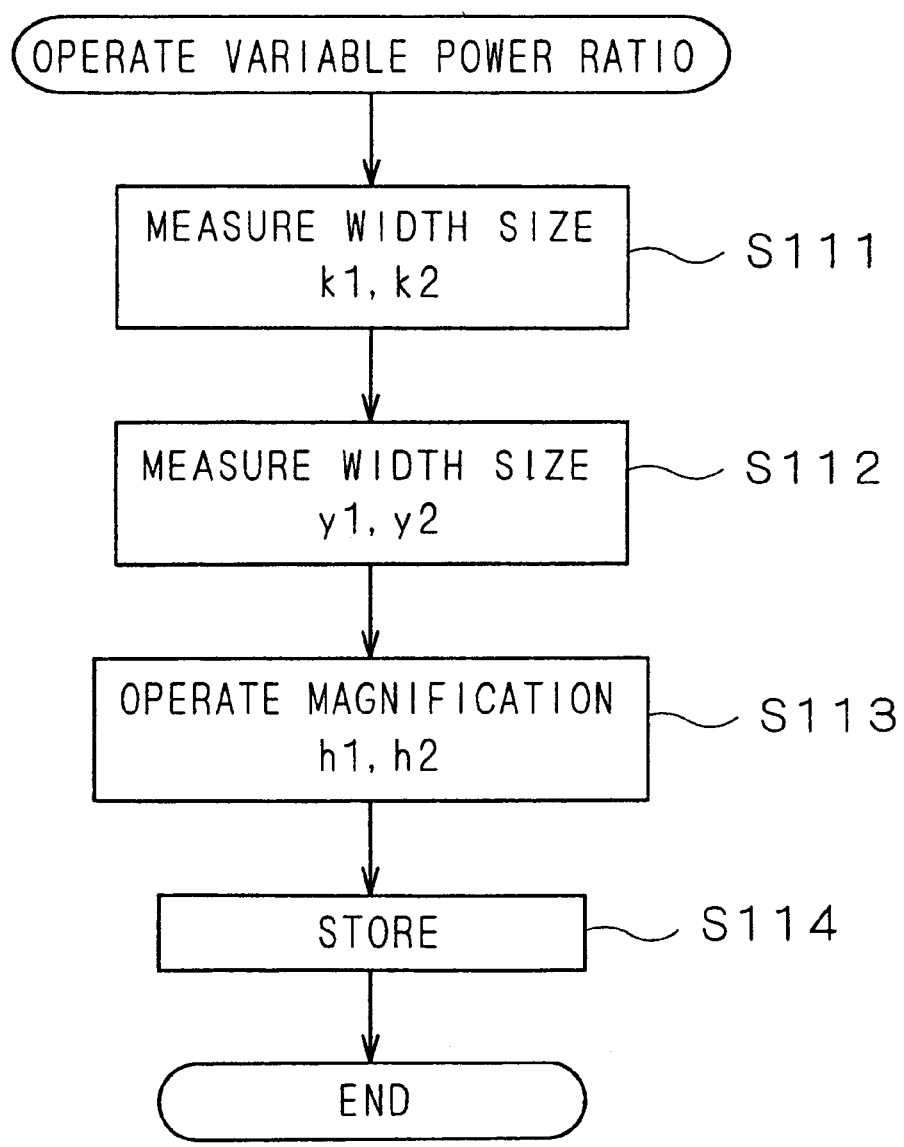
FIG. 13 is a flow chart showing a procedure of a magnification operation in the multicolor printing device.
Figure 16:
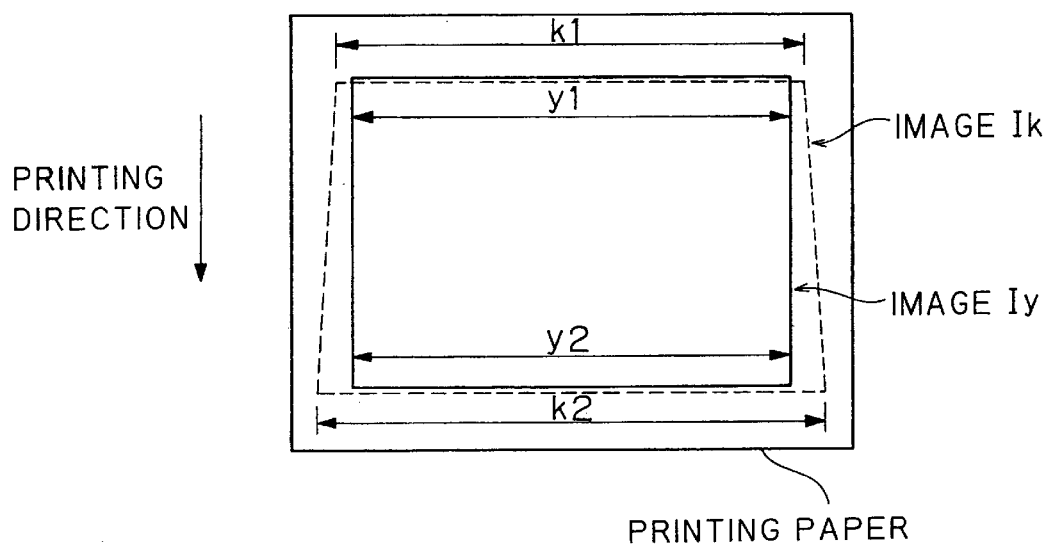
FIG. 16 is an explanatory diagram for illustrating displacement of an image in a plate cylinder axial direction on a printing paper.

Following FIG. 13 is a flow chart indicating a flow of calculating the magnification from the measurement of the displacement quantity. In the following description, FIG. 16 is employed as to description of a displacement quantity of a color plate on the printing paper. In the example shown in FIG. 16, dotted lines show the position of a previously printed black-color image Ik, and it is assumed that the upper end side of the image is a recording starting side. In this example, the image Ik is deformed into such a trapezoidal shape (FIG. 16 exaggerates) that the paper tail side spreads as shown in FIG. 16 due to elongation of the printing paper. On the other hand, solid lines show an exemplary subsequently printed yellow-color image Iy substantially keeping an original square shape. This example ignores elongation in the rotational direction of plate cylinders, in order to simplify understanding. Remaining colors are also omitted.

At a step S111, a width size k1 of an upper end portion and a width size k2 on a lower end portion in an image Ik are first calculated from position coordinates of positioning marks R1 to R14 provided on the left and the right of the image Ik. Similarly, a width size y1 on an upper end portion and width size y2 on a lower end portion of an image Iy are calculated at a subsequent step S113.

At a step S113, it first obtains the magnification of the image Ik with respect to the image Iy from the obtained width sizes k1, k2, y1 and y2. That is, a magnification h1 on the upper end of the image Ik with respect to the image Iy is calculated as h1=k1/y1, and a magnification h2 on the lower end portion is calculated as h2=k2/y2. According to this example, therefore, it is possible to equalize the length of the image Iy with respect to the image Ik by enlarging the image Iy by the magnification h1 when recording the upper end portion of the image and enlarging the image Iy by the magnification h2 when recording the lower end portion of the image.

As to the above magnifications h1 and h2, they are calculated on the upper end portion and the lower end potion of the image IM but are not calculated on an intermediate portion thereof. Therefore, the magnification of the intermediate portion is obtained by an interpolation calculation employing the aforementioned magnifications h1 and h2. If it is the simplest linear interpolation, for example, a magnification h(i) on an i-th main scanning line from the upper end portion can be expressed as follows, assuming that an integer N represents a scanning line number of the image Iy in the subscanning direction:

$$h(i)=h1+i\cdot(h2-h1)/N \qquad \text{expression 6}$$

where the variable "i" is an arbitrary integral value in an integer range 0 to N.

In this preferred embodiment, it is possible to vary the image size by changing the rotational speed of a polygon mirror 55 in the main scanning direction (plate cylinder axial direction) successively along the order of scanning lines in response to the magnification h(i).

When changing the rotational speed of the polygon mirror 55 as in this preferred embodiment, on the other hand, the starting position in the main scanning direction specified by the timing memory 63 is displaced. Therefore, addresses XS and XE corresponding to the recording starting position and the end position of the timing memory 63 must also be rewritten in response to the speed of the polygon mirror 55.

For example, a change quantity m(i, i+1) of the image size between the i-th main scanning line and an (i+1)th main scanning line counted from the upper end portion of the image y is:

$$m(i, i+1)=y(i+1)\cdot h(i+1)-y(i)\cdot h(i) \qquad \text{expression 7}$$

where y(i) represents a width size in the i-th main scanning line of the image y, and the values between the width size y1 of the upper end portion and the width size y2 of the lower end portion are obtained by a linear interpolation operation as:

$$y(i)=y1+i\cdot(y2-y1)/N \qquad \text{expression 8}$$

where the subscript "i" is an integral value in a section of 0 to N.

When uniformly distributing this change quantity m(i, i+1) of the image size on the left and the right of the image, it is necessary to displace the recording starting position in the main scanning direction by m(i, i+1)/2. Since this change quantity m(i, i+1)/2 is generally an extremely small quantity, the change quantity m(i, i+1)/2 of the size is line-sequentially accumulated every main scanning line and the address of the recording starting position of the timing memory is carried one by one when this cumulative value reaches an image size corresponding to one address of the timing memory.

At a step S114, the obtained magnifications h1 and h2 are stored in storage means 43 in correspondence to the printing order or printing colors of the image Iy, and this flow is completed.

On the other hand, elongation of a printing paper may be larger on a paper tail side than a paper grip side, and it may not be correct to merely linearly interpolate the space between the upper end portion and the lower end portion as described above. In this case, a positioning mark may also be prepared on the intermediate portion in the subscanning direction, for calculating magnifications on a plurality of portions. Thus, interpolation accuracy between positioning marks rises.

Figure 14:
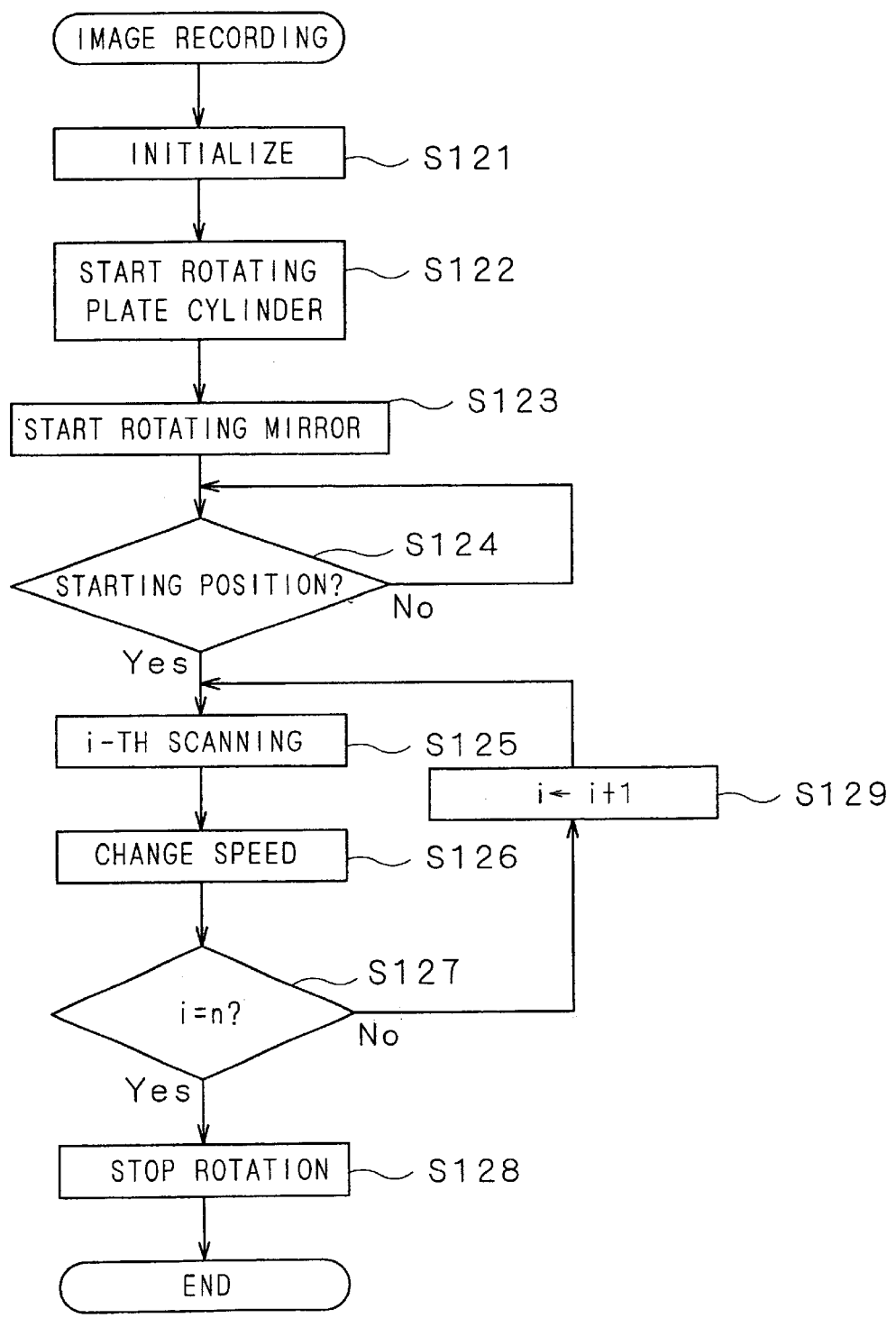
FIG. 14 is a flow chart showing a procedure of image recording in the multicolor printing device.
Figure 15:
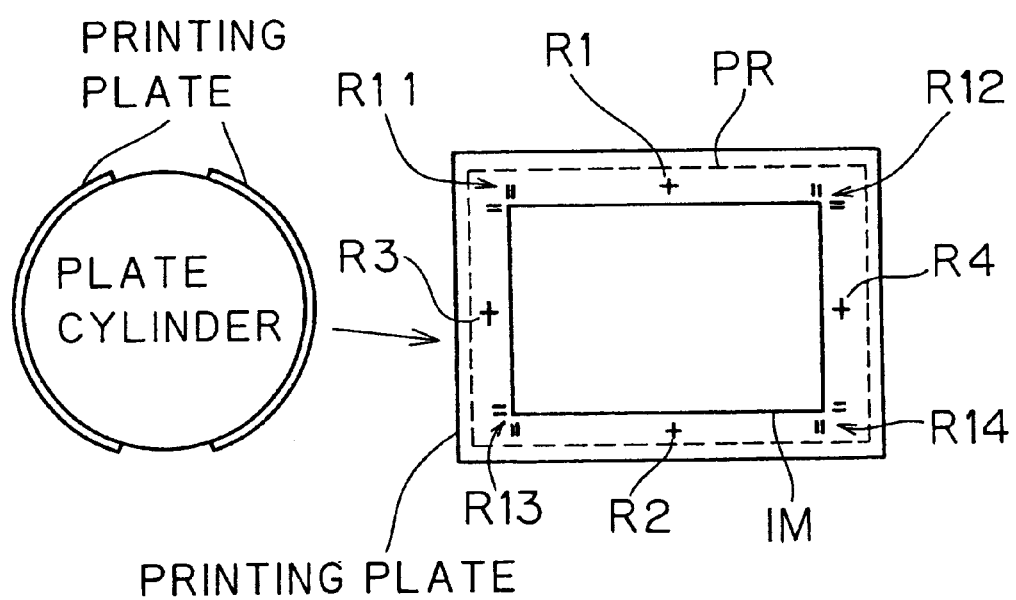
FIG. 15 is an explanatory diagram showing the printing plate.

FIG. 14 is a flow chart showing a procedure of recording the image Iy while correcting the same on the basis of the aforementioned magnification. Referring to FIG. 14, various initializations such as variable i=0 described later are first performed at a step S121. At a step S122, the plate cylinders start rotating at a prescribed reference speed.

At a subsequent step S123, the polygon mirror 55 is rotated at a rotational speed V=V0/h1. At this point, the rotational speed V0 is a reference rotational speed at the time of recording the original image Ik.

At a subsequent step S124, it determines whether or not it has reached the recording starting position in the subscanning direction. When reaching the recording starting position, a laser light source 54 is ON/OFF-controlled on the basis of image data and i-th main scanning is performed at a subsequent step S125. The variable "i" is an integral value in the section of 0 to N.

When recording for single main scanning completes, the rotational speed V of the polygon mirror is corrected to reach a corrected rotational speed V=V0/h(i) at a subsequent step S126. However, $$h(i)=h1+i\cdot(h2-h1)/N \qquad \text{expression 9}$$

At this time, the recording starting position is also properly changed in the main scanning direction by the timing memory 63.

At a subsequent step S127, whether or not i=N is determined. That is, it follows that recording of the image has been ended if i=N, and hence it advances to a step S128. At the step S128, rotation of the plate cylinders is stopped following receiving of a plate cylinder rotation end signal ye, and operations of respective parts are completed.

If not i=N at the step S127, it increments the variable "i" at a step S129 and returns to the step S125.

In this preferred embodiment, as described in the above, the scanning rate in the main scanning direction changes in order of the subscanning direction so that the image is varied line-sequentially in main scanning, whereby a recording position for the image Iy matches with a recording position for the image Ik.

While the rotational speed of the polygon mirror 55 is changed a little every single main scanning in this preferred embodiment, the rotational speed may be changed stepwise in units of a plurality of scanning lines. In the simplest example, the rotational speed V0/h1 of the polygon mirror 55 may be set for a first half area from the upper end portion of the image to the image central portion, and the same rotational speed V0/h2 may be set for a rear half area from the image central portion to the rear end portion.

Fourth Preferred Embodiment

While the speed of the polygon mirror 55 is changed for changing the magnification in the main scanning direction in the aforementioned third preferred embodiment, change of the magnification may be achieved by varying the cycle of the dot clock signal dc for ON/OFF-controlling the laser light source 54. That is, assuming that T0 represents a reference cycle of the dot clock signal dc at the time of recording the image Ik, a cycle T of the dot clock signal dc in an i-th scanning line may be set to:

$$T=h(i)\cdot T0 \qquad \text{expression 10}$$

where $$h(i)=h1+i\cdot(h2-h1)/N \qquad \text{expression 11}$$

i=0 to N

Since the read timing for the timing memory 63 changes following change of the dot clock signal dc also in this case, it changes setting of a recording starting address XS.

Fifth Preferred Embodiment

While description has been made only as to magnification change of the images in the main scanning directions (axial directions of the plate cylinders) in the aforementioned third and fourth preferred embodiments, a printing paper elongates also in a subscanning direction (rotational direction of plate cylinders). In the fifth preferred embodiment, description is now made as to positioning in the subscanning direction.

Figure 17:
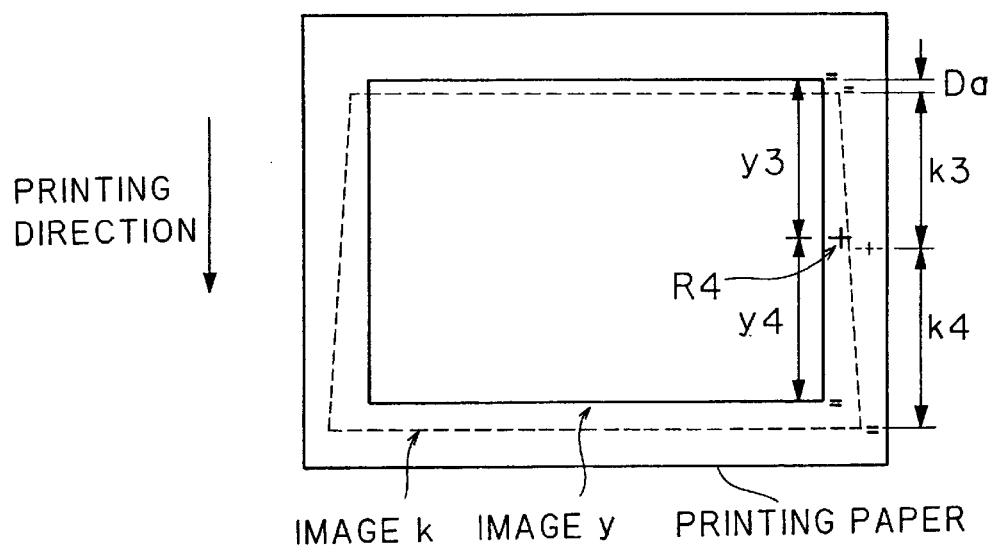
FIG. 17 is an explanatory diagram for illustrating displacement of an image in a plate cylinder rotational direction on a printing paper.
Figure 18:
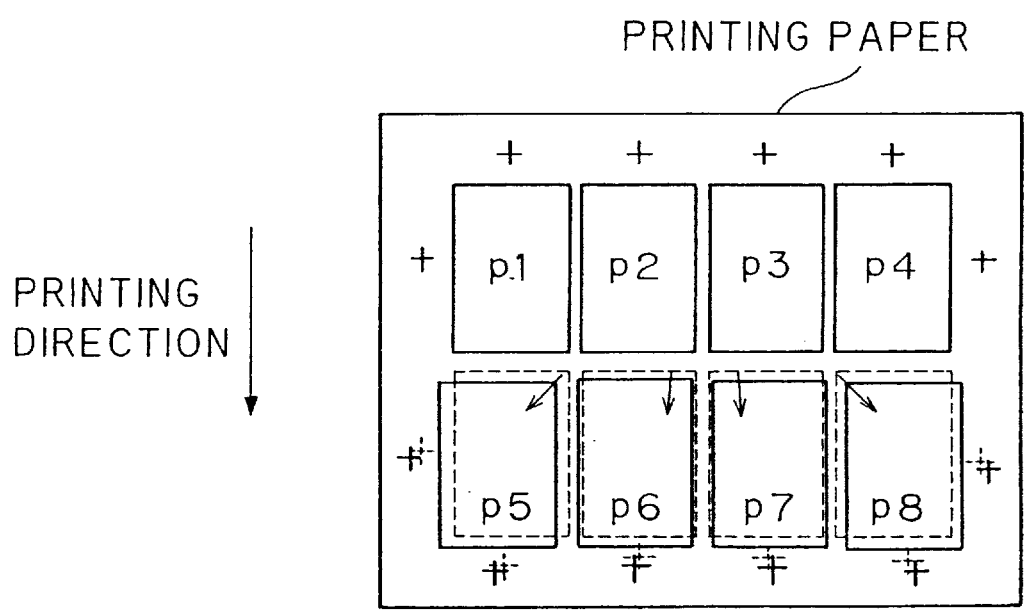
FIG. 18 is an explanatory diagram for illustrating arrangement of images in a conventional exposure apparatus.

FIG. 17 shows such an example that a printing paper has elongated in a rotational direction of plate cylinders, and dotted lines in FIG. 17 show a precedently printed image Ik, while solid lines show a subsequently printed image Iy. In the example shown in FIG. 17, symbol k3 expresses the size from an upper end portion of the image Ik to a positioning mark R4 provided in correspondence to a central portion of the image Ik;

symbol k4 expresses the size from the positioning mark R4 to a lower end portion of the image Ik;

symbol y3 similarly expresses the size from an upper end portion of the image Iy to the positioning mark R4; and symbol y4 expresses the size from the positioning mark R4 to a lower end portion; respectively. Symbol Da is a displacement quantity on the upper end portions of the image Ik and the image Iy.

In a first half area from the upper end portion of the image to the central portion in this case, the magnification h3 of the image Ik with respect to the image Iy is:

$$h3=k3/y3 \qquad \text{expression 12}$$

and in the rear half area, the magnification h4 of the image Ik with respect to the image Iy is:

$$h4=k4/y4 \qquad \text{expression 13}$$

When recording the image Iy, therefore, the image Iy is enlarged in the subscanning direction with the magnification h3 in the first half area and the image Iy is enlarged in the subscanning direction with the magnification h4 in the rear half area. In positioning of the image upper end portions of the image Ik and the image Iy, it may displace the recording starting position of the image Iy by Da.

As to magnification change of the image in the subscanning direction, it may change the rotational speed of the plate cylinders. That is, the rotational speed U of the plate cylinders may be set to:

U=U0/h3 in the first half area up to the positioning mark R4, and

U=U0/h4 in the rear half area up to the positioning mark R4 for rotating the plate cylinders at the respective rotational speeds. Symbol U0 represents a reference rotational speed of the plate cylinders at the time of recording the image Ik.

Sixth Preferred Embodiment

While the image of the subsequently printed color plate is matched with respect to the precedently printed color plate in the aforementioned preferred embodiments, this may be reversed. In the third preferred embodiment, for example, the magnification of the image Ik may be previously changed with reference to the image Iy.

Seventh Preferred Embodiment

The magnification is obtained in correspondence to the printing color (printing order), and is employed when recording an image of the corresponding color. At this time, positioning can be further precisely performed when storing the value of the magnification every printing condition, particularly every type of the printing paper for changing the magnification on the basis of the used printing paper.

While the preferred embodiments of the present invention have been described, the scope of the present invention is not restricted to these but various modifications are possible.

What is claimed is:

1. A printing device comprising an image recording part (13) capable of recording an image on a printing plate on a plate cylinder (1, 2) and a printing part capable of printing said image on a printing paper with said printing plate, further comprising:

an input part capable of inputting an evaluation value of a spatial recording error including dimensional change of a printing range caused when printing an objective image on a printing paper in said printing part; and a control part (17) controlling said image recording part (13) in response to said evaluation value thereby recording a corrected image subjected to correction of said spatial recording error on said printing plate, wherein said evaluation value of said spatial recording error includes:

a first printing displacement value (a) on an upstream part of said objective image in a rotational direction of said plate cylinder (1, 2), a second printing displacement value (b) on a downstream part of said objective image in said rotational direction, and an intermediate printing displacement value obtained at an intermediate point (R3, R4) between said upstream part and said downstream part of said objective image in the rotational direction of said plate cylinder, and said control part comprises:

a first calculation element calculating a correction value for a recording starting position (P1) of said objective image in said rotational direction on the basis of said first printing displacement value, a second calculation element calculating a first correction value for the image dimension of said objective image along said rotational direction on the basis of said first printing displacement value and said intermediate printing displacement value, and a second correction value for the image dimension of said objective image along said rotational direction on the basis of said intermediate printing displacement value and said second printing displacement value, and a correction value output element supplying the correction value for said recording starting position (P1) and said first and second correction value for said image dimension to said image recording part for recording a corrected image on said printing plate, correcting the dimension of said corrected image every part in response to each of said first and second correction values for said image dimension.

2. The printing device according to claim 1, wherein said plate cylinder (1, 2) comprises a plurality of printing regions in the circumferential direction of said plate cylinder, and said first calculation element operates a correction value for a specific recording starting position as to each of said plurality of printing regions.

3. The printing device according to claim 1, wherein said plate cylinder (1, 2) comprises a plurality of printing regions in the circumferential direction of said plate cylinder, and said second calculation element operates a correction value for a specific image dimension as to each of said plurality of printing regions.

4. The printing device according to claim 1, wherein
an image recording beam scans said printing plate along a scanning line substantially parallel to the axial direction of said plate cylinder (1, 2) while rotating said plate cylinder (1, 2) in said image recording part (13), and
said control part operates:
- to supply first change to said rotational speed (K Vd) of said plate cylinder in a period supplying said image recording beam to said printing plate for scanning an area upstream said intermediate point (R3, R4), and
- to supply second change to the rotational speed of said plate cylinder in a period supplying said image recording beam to said printing plate for scanning an area downstream said intermediate point,
- whereby correction responsive to said first and second correction values for said image dimension is included in said corrected image.

5. The printing device according to claim 1, wherein
said intermediate printing displacement value includes a plurality of printing displacement values obtained on a plurality of intermediate points respectively, and
said control part individually changes the rotational speed of said plate cylinder on areas between said plurality of intermediate points on the basis of said plurality of printing displacement values.

6. The printing device according to claim 1, wherein
first and second positioning marks (R1, R2) are formed on said upstream part and said downstream part of said objective image in the rotational direction of said plate cylinder respectively, and
said first and second printing displacement values are obtained by measuring printing displacement of said first and second positioning marks.

7. The printing device according to claim 1, wherein
said control part comprises:
an element recalculating change of said recording starting position (P1) on the basis of change of said image dimension.

8. The printing device according to claim 1, wherein
the evaluation value of said spatial recording error further includes:
- a third printing displacement value on an end of said objective image in the axial direction of said plate cylinder, and
- a fourth printing displacement value on the other end of said objective image in said axial direction,
said control part:
- a third calculation element calculating a correction value for a recording starting position of said objective image in said axial direction on the basis of said third printing displacement value, and
- a fourth calculation element calculating a correction value for the image dimension of said objective image along said axial direction on the basis of said third and said fourth printing displacement values, and
- said correction value output element further supplies correction values for the respective ones of said recording starting position and said image dimension in said axial direction to said image recording part for recording said corrected image on said printing plate.

9. The printing device according to claim 1, further comprising:
a measuring element (35) arranged in said printing part for detecting said first and second printing displacement values by reading said objective image printed on said printing paper (S) by said printing part.

10. The printing device according to claim 1, further comprising:
a database storing said correction value for a recording starting position and said first and second correction value for the image dimension corresponding to each of a plurality of printing conditions (A1, A2, . . . ); and
a correction data specifying element specifying suitable correction data suitable for a specified printing condition on the basis of said database; wherein
said control part controls said image recording part on the basis of said suitable correction data thereby recording a corrected image correcting said image recording position of said objective image on said printing plate.

11. The printing device according to claim 10, wherein
said plurality of printing conditions include at least one of:
the type of a printing paper,
the paper thickness of the printing paper,
the direction of the paper texture of the printing paper, and
the order of printed colors.

12. The printing device according to claim 10, wherein
said plate cylinder comprises a plurality of printing regions in the circumferential direction of said plate cylinder, and
said suitable correction date are individually selected as to the respective ones of said plurality of printing regions.

13. The printing device according to claim 10, wherein
said printing part comprises:
a blanket cylinder (3, 4) transferring an ink image from said printing plate to a printing paper, and
said plurality of printing conditions include a condition stating that a blanket of said blanket cylinder has been exchanged or remounted.

14. The printing device according to claim 10, wherein
said correction data specifying element comprises:
a display element (42) displaying a plurality of correction data in correspondence to said specified printing condition, and
said input part enables an operator to select said suitable correction data from displayed said plurality of correction data.

15. A printing device comprising an image recording part (13) capable of recording an image on a printing plate on a plate cylinder (1, 2) and a printing part capable of printing said image on a printing paper with said printing plate, further comprising:
an input part capable of inputting an evaluation value of a spatial recording error including dimensional change of a printing range caused when printing an objective image on a printing paper in said printing part; and
a control part (17) controlling said image recording part (13) in response to said evaluation value thereby recording a corrected image subjected to correction of said spatial recording error on said printing plate, wherein
said printing part is capable of printing a multicolor color image on said printing paper by successively overprinting a plurality of color component images (Ik, Iy) on said printing paper, and
said control part controls said image recording part in response to said evaluation value for recording said corrected image of said objective image on said printing plate line-sequentially along a predetermined direction with stepwisely or continuously varied recording magnifications.

16. The printing device according to claim 15, wherein an image recording beam scans said printing plate along a scanning line substantially parallel to the axial direction of said plate cylinder while rotating said plate cylinder in said image recording part, and said control part controls said image recording part for stepwisely or continuously changing the scanning rate of said image recording beam in each scanning line, thereby varying said recording magnifications.

17. The printing device according to claim 15, wherein an image recording beam is ON/OFF-controlled in said image recording part in response to an image signal, said recording magnification being changed by changing the ON/OFF-control timing for said image recording beam.

18. The printing device according to claim 15, wherein said control part controls said image recording part in response to said evaluation value for recording said objective image on said printing plate while stepwisely or continuously changing not only said recording magnification for said objective image in said axial direction of said plate cylinder but also the recording magnification for said objective image in the rotational direction of said plate cylinder, thereby obtaining said corrected image on said printing plate.

19. The printing device according to claim 18, wherein change of said recording magnification for said objective image in the rotational direction of said plate cylinder is attained by changing the rotational speed of said plate cylinder while scanning said printing plate with said image recording beam.

20. The printing device according to claim 15, wherein said recording magnification varies with difference between the printing order or the color components of the respective ones of said plurality of color component images.

21. The printing device according to claim 15, wherein said recording magnification is increased on a paper tail side of said printing paper.

22. An image recording method in a printing device comprising an image recording part (13) capable of recording an image on a printing plate on a plate cylinder (1, 2) and a printing part capable of printing said image on a printing paper with said printing plate, comprising:

an evaluation value input step of inputting an evaluation value of a spatial recording error including dimensional change of a printing range resulting when printing an objective image on a printing paper with said printing part; and a recording control step of controlling said image recording part (13) in response to said evaluation value thereby recording a corrected image subjected to correction of said spatial recording error on said printing, wherein said image recording part is controlled in response to said evaluation value for recording to record said corrected image of said objective image on said printing plate line-sequentially along a predetermined direction with stepwisely or continuously varied recording magnifications.

* * * * *